(12) United States Patent
Ma et al.

(10) Patent No.: US 9,258,102 B2
(45) Date of Patent: Feb. 9, 2016

(54) METHODS AND SYSTEMS TO MITIGATE INTER-CELL INTERFERENCE

(75) Inventors: Jianglei Ma, Kanata (CA); Ming Jia, Ottawa (CA); Wen Tong, Ottawa (CA); Peiying Zhu, Kanata (CA); Evelyne Le Strat, Paris (FR); Sarah Boumendil, Chevreuse (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 1468 days.

(21) Appl. No.: 11/990,868

(22) PCT Filed: Aug. 23, 2006

(86) PCT No.: PCT/CA2006/001384
§ 371 (c)(1),
(2), (4) Date: Mar. 9, 2009

(87) PCT Pub. No.: WO2007/022631
PCT Pub. Date: Mar. 1, 2007

(65) Prior Publication Data
US 2009/0245197 A1    Oct. 1, 2009

Related U.S. Application Data

(60) Provisional application No. 60/710,584, filed on Aug. 23, 2005.

(51) Int. Cl.
*H04W 72/04* (2009.01)
*H04L 5/00* (2006.01)
(Continued)

(52) U.S. Cl.
CPC ............ *H04L 5/0062* (2013.01); *H04L 5/0046* (2013.01); *H04L 5/0048* (2013.01); *H04W 16/02* (2013.01); *H04L 5/0007* (2013.01); *H04L 5/0032* (2013.01); *H04W 16/12* (2013.01)

(58) Field of Classification Search
USPC ......................................... 370/329, 208, 330
See application file for complete search history.

(56) References Cited

U.S. PATENT DOCUMENTS 6,262,980 B1 *   7/2001   Leung et al. ................... 370/336
6,907,228 B1 *   6/2005   Lohtia et al. .................... 455/62
(Continued)

FOREIGN PATENT DOCUMENTS

EP    1178641          2/2002
EP    1178641 A1 *    2/2002
(Continued)

OTHER PUBLICATIONS

"International Search Report and Written Opinion", Application No. PCT/CA2006/001384, (Dec. 19, 2006), 6 pages.
(Continued)

*Primary Examiner* — Dang Ton
*Assistant Examiner* — Pamit Kaur
(74) *Attorney, Agent, or Firm* — Judy Yee; Micky Minhas

(57) ABSTRACT

The present invention provides methods and devices for mitigating inter-cell interference in communication environments having a plurality of cells. In some embodiments, a time-frequency transmission resource that includes multiple sub-carriers over multiple OFDM symbol intervals is partitioned into a first zone and a second zone. In the first zone, transmissions are transmitted on at least one frequency sub-band which is common to all of the plurality of cells. In the second zone, transmissions are transmitted on at least one frequency sub-band which is used by less than all of the plurality of cells, so as to mitigate inter-cell interference. In some embodiments, in the first zone transmissions are transmitted using a transmission power which is common to all of the plurality of cells and in the second zone transmissions are transmitted using a transmission power which is used by less than all of the plurality of cells so as to mitigate inter-cell interference.

25 Claims, 14 Drawing Sheets

(51) Int. Cl.
*H04W 16/02* (2009.01)
*H04W 16/12* (2009.01)

(56) References Cited

U.S. PATENT DOCUMENTS

| | | | |
|---|---|---|---|
| 7,551,546 B2* | 6/2009 | Ma et al. | 370/208 |
| 7,636,334 B2* | 12/2009 | Gerlach | 370/330 |
| 2004/0106412 A1 | 6/2004 | Laroia et al. | |
| 2004/0190640 A1 | 9/2004 | Dubuc et al. | |
| 2005/0073973 A1 | 4/2005 | Laroia et al. | |
| 2005/0096061 A1* | 5/2005 | Ji et al. | 455/450 |
| 2005/0111406 A1 | 5/2005 | Pasanen et al. | |
| 2005/0135324 A1* | 6/2005 | Kim et al. | 370/343 |
| 2005/0265222 A1* | 12/2005 | Gerlach | 370/208 |
| 2006/0003767 A1* | 1/2006 | Kim et al. | 455/436 |

FOREIGN PATENT DOCUMENTS

| | | |
|---|---|---|
| EP | 1530387 | 5/2005 |
| WO | WO 0249305 A1 | 6/2002 |
| WO | WO 2004004269 A1 | 1/2004 |

OTHER PUBLICATIONS

"Extended European Search Report", European Patent Application No. 06790567.9, (Mar. 25, 2013), 4 Pages.

"Decision to Grant", EP Application No. 06790567.9, Feb. 6, 2014, 1 Page.

"Foreign Office Action", EP Application No. 14000754.3, Jul. 25, 2014, 3 Pages.

"Extended European Search Report", EP Application No. 14000754.3, May 15, 2014, 4 pages.

* cited by examiner

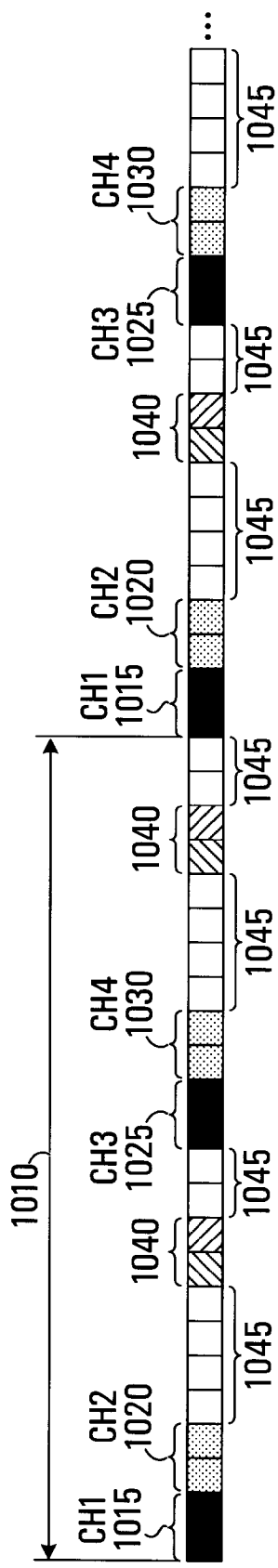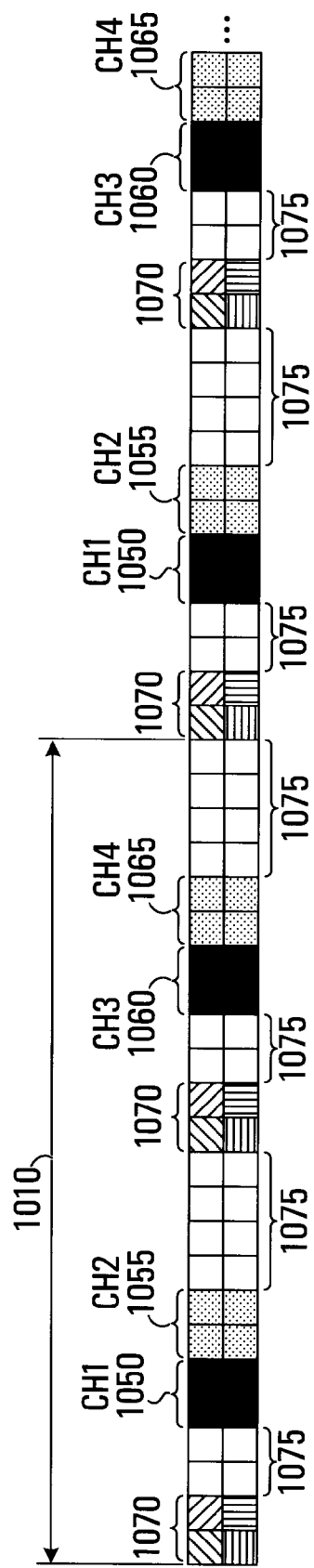
FIG. 10A
FIG. 10B

METHODS AND SYSTEMS TO MITIGATE INTER-CELL INTERFERENCE

RELATED APPLICATIONS

This application claims the benefit of and is a National Phase Entry of International Application Number PCT/CA2006/001384 filed Aug. 23, 2006, and claims the benefit of U.S. Provisional Patent Application No. 60/710,584 filed Aug. 23, 2005, all of which are incorporated herein by reference.

FIELD OF THE INVENTION

The invention generally relates to the field of wireless communications. More specifically, the invention relates to mitigating inter-cell interference in communication environments using an orthogonal frequency division multiplexing (OFDM) based air interface or a transformed OFDM based air interface.

BACKGROUND OF THE INVENTION

A frequency re-use-1 scheme is commonly employed in OFDM based cellular networks. The frequency re-use-1 scheme involves each cell in a communication network using the same available bandwidth. Suppressing inter-cell interference to improve coverage and increase cell edge bit rates, however, is a challenge. A number of techniques have been considered to mitigate inter-cell interference.

One way is to use a fractional frequency re-use scheme, where each cell occupies only part of the available bandwidth. For example, a fractional frequency re-use approach for three base stations each associated with a respective cell involves each BS transmitting traffic to its respective cell using ⅓ of the available bandwidth. One drawback to such an approach is that it dramatically reduces network capacity, as compared to a frequency re-use-1 scheme where each cell uses all of the available bandwidth.

Another alternative is to use orthogonal frequency code division multiplexing (OFCDM), where frequency domain spreading is achieved using code division multiplexing. While such an approach achieves a spreading gain, performance degradation occurs as a result of orthogonality loss. In addition, when using such a scheme decoding and decoding hardware complexity increases.

Frequency hopping is another approach for inter-cell interference mitigation.

Yet another approach is to use macro diversity techniques including, for example, fast cell selection or soft handoff. Such an approach, however, introduces more complexity to the network.

Similarly, inter-cell interference cancellation techniques introduce more complexity in the receiver and are, therefore, not practical to be implemented everywhere.

SUMMARY OF THE INVENTION

According to a first aspect of the invention there is provided a method for execution in an OFDM communications environment having a plurality of cells, comprising: for a transmitter corresponding to a first cell; partitioning a time-frequency transmission resource comprising a plurality of sub-carriers over a plurality of OFDM symbol intervals into a first zone and a second zone; in the first zone, transmitting on at least one set of sub-carriers which is used by all of the plurality of cells; in the second zone, transmitting on at least one set of sub-carriers which is used by less than all of the plurality of cells so as to mitigate inter-cell interference.

In some embodiments when at least one other cell of the plurality of cells uses a same first and second zone partitioning of a respective time-frequency transmission resource, the method further comprises: the at least one other cell, in the second zone, transmitting on at least one set of sub-carriers which is different than the set of sub-carriers used by the transmitter of the first cell.

In some embodiments transmitting in the second zone on at least one set of sub-carriers further comprises: transmitting on at least one set of sub-carriers which is different than sets of sub-carriers used by transmitters corresponding to respective cells adjacent to the first cell.

In some embodiments the method further comprises: for a transmitter corresponding to a second cell; partitioning an OFDM transmission resource into a first zone and a second zone in coordination with the partitioning of the time-frequency transmission resource of the first cell such that zone partitioning of the first and second cells is the same; in the second zone, transmitting on at least one set of sub-carriers which is different than the at least one set of sub-carriers used by the transmitter of the first cell.

In some embodiments the method further comprises: for a transmitter corresponding to a second cell; partitioning an time-frequency transmission resource into a first zone and a second zone independently of the partitioning of the OFDM transmission resource of the first cell.

In some embodiments partitioning the time-frequency transmission resource into a first zone and a second zone is based on time division multiplexing (TDM).

In some embodiments partitioning the time-frequency transmission resource into a first zone and a second zone is based on frequency division multiplexing (FDM).

In some embodiments partitioning the time-frequency transmission resource into a first zone and a second zone is based on combined TDM/FDM.

In some embodiments the method further comprises inserting control information in a control channel formed in at least one OFDM symbol in the time-frequency transmission resource.

In some embodiments the method further comprises inserting scattered pilot symbol information in the time-frequency transmission resource.

In some embodiments the method further comprises inserting the pilot symbol information of the transmitter of the first cell in the time-frequency transmission resource with a pattern that is the same as the other cells of the plurality of cells, but is shifted in time and/or frequency with respect to the other cells.

In some embodiments inserting scattered pilot symbol information comprises inserting pilot symbols into the at least one time-frequency channel resource for transmission on N transmitting antenna where N>=1, the method further comprising: for each antenna partitioning N time-frequency channel resources to be simultaneously transmitted on N antennas into a set of corresponding first zones and a set of corresponding second zones, each set of corresponding first zones consisting of a first zone for each of the N time-frequency channel resources and each set of corresponding second zones consisting of a second zone for each of the N time-frequency channel resources, all the first and second zones in a given set of corresponding zones having a common size and location; in the set of corresponding first zones, transmitting on the at least one set of sub-carriers which is used by all of the plurality of cells; and in the set of corresponding second zones, transmitting on the at least one set of sub-carriers which is used by less than all of the plurality of cells to mitigate inter-cell interference between the at least two cells.

In some embodiments in the first zone, transmitting on at least one set of sub-carriers comprises transmitting with a frequency re-use-1 scheme.

In some embodiments in the second zone, transmitting on at least one set of sub-carriers comprises transmitting with a fractional frequency re-use scheme.

In some embodiments transmitting with a fractional frequency re-use scheme for the transmitter comprises transmitting at least one of channel control information, data, and pilot symbol information in M locations of an OFDM symbol and nulls in N locations of the OFDM symbol, in which the OFDM symbol has M+N locations, where the nulls are used for at least one of channel control information, data, and pilot symbol information in other cells of the plurality of cells.

In some embodiments transmitting with a fractional frequency re-use scheme further comprises transmitting pilot symbol information having a pattern in the time-frequency transmission resource of the transmitter of the first cell that is the same as the other cells, but is shifted in time and/or frequency with respect to the other cells.

In some embodiments a sub-channel definition using the fractional frequency re-use scheme is defined as L sub-carrier pairs with a given separation across J consecutive OFDM symbols when the transmission resource has K sub-bands, each of the K sub-bands consisting of L consecutive sub-carriers.

In some embodiments the at least one set of sub-carriers in the second zone comprises a plurality of contiguous sub-carriers.

In some embodiments the at least one set of sub-carriers in the second zone comprises a plurality of contiguous sub-carriers.

In some embodiments the plurality of OFDM symbols comprises an odd number of OFDM symbols.

In some embodiments the partitioning of the at least one time-frequency transmission resource into the first zone and the second zone is dynamically configurable.

In some embodiments the time-frequency transmission resource is one of an OFDM transmission resource and a transformed OFDM transmission resource.

According to a second aspect of the invention, there is provided a method for execution in an OFDM communications environment having a plurality of cells, comprising: for a transmitter corresponding to a first cell; partitioning an time-frequency transmission resource comprising a plurality of sub-carriers over a plurality of OFDM symbol intervals into a first zone and a second zone; transmitting in the first zone using a transmission power which is used by all of the plurality of cells; transmitting in the second zone using a transmission power which is used by less than all of the plurality of cells so as to mitigate inter-cell interference.

In some embodiments transmitting in the second zone using a transmission power which is used by less than all of the plurality of cells further comprises: transmitting using a transmission power which is larger than a transmission power used by transmitters corresponding to respective cells adjacent to the first cell.

In some embodiments the method further comprises: for a transmitter corresponding to a second cell; partitioning an time-frequency transmission resource into a first zone and a second zone in coordination with the partitioning of the OFDM transmission resource of the first cell such that zone partitioning of the first and second cells is the same; transmitting in the second zone using a transmission power which is less than a transmission power used in the first zone which is used by all of the plurality of cells.

In some embodiments the method further comprises: for a transmitter corresponding to a second cell; partitioning an time-frequency transmission resource into a first zone and a second zone independently of the partitioning of the OFDM transmission resource of the first cell.

In some embodiments partitioning the time-frequency transmission resource into a first zone and a second zone is based on any one of a group consisting of time division multiplexing (TDM), frequency division multiplexing (FDM), and combined TDM/FDM.

In some embodiments the method further comprises inserting control information in a control channel formed in at least one OFDM symbol in the time-frequency transmission resource.

In some embodiments the method further comprises inserting scattered pilot symbol information in the time-frequency transmission resource.

According to further aspects of the invention, there is provided an OFDM transmitter adapted to perform the methods described above.

In some embodiments the time-frequency transmission resource is one of an OFDM transmission resource and a transformed OFDM transmission resource.

According to another aspect of the invention there is provided a communication network comprising: a plurality of telecommunication cells, each cell comprising an OFDM transmitter, the OFDM transmitter in each respective cell adapted to: partition an time-frequency transmission resource comprising a plurality of sub-carriers over a plurality of OFDM symbol intervals into a first zone and a second zone; in the first zone, transmit on at least one set of sub-carriers which is used by all of the plurality of cells; in the second zone, transmit on at least one set of sub-carriers which is used by less than all of the plurality of cells so as to mitigate inter-cell interference.

In some embodiments at least two OFDM transmitters coordinate the partition of the time-frequency transmission resource used by each respective OFDM transmitter and selection of the set of sub-carriers used to transmit in the second zone by each respective OFDM transmitter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which:

FIGS. 10A and 10B contain schematic diagrams illustrating examples of sub-channel definitions for fractional frequency re-use in a single OFDM symbol and in a low inter-cell interference zone, respectively;

DETAILED DESCRIPTION OF THE EMBODIMENTS OF THE INVENTION

Figure 1:
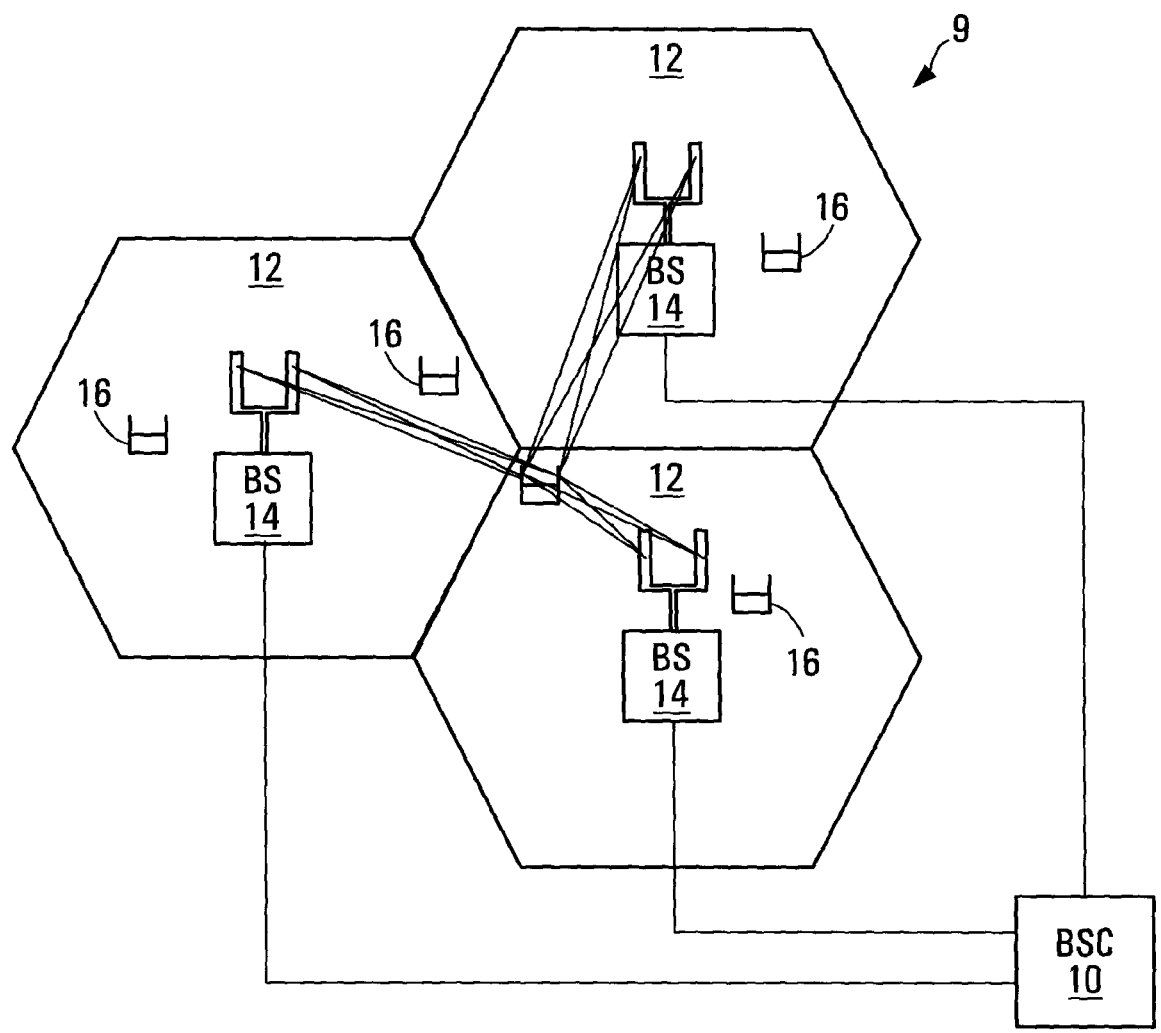
FIG. 1 is a block diagram of a cellular communication system.

FIG. 1 illustrates an example of a communications environment 9 having three cells 12. FIG. 1 shows a base station controller (BSC) 10 that controls wireless communications within the three cells 12, in which each cell is served by a respective base station (BS) 14. In general, each respective base station 14 facilitates communication using OFDM with mobile and/or wireless terminals 16, which are within the cell 12 associated with the respective base station 14. The movement of the mobile terminals 16 in relation to the base stations 14 results in significant fluctuation in channel conditions. As illustrated, the base stations 14 and wireless terminals 16 may include multiple antennas to provide spatial diversity for communications.

In some implementations a wireless terminal 16 is a wireless device such as a cellular telephone, computer with a wireless modem, or PDA. In some implementations the wireless terminal has a fixed location. In other implementations the wireless terminal is nomadic or mobile.

In a communications network having multiple cells in which each cell has a BS that transmits with a frequency re-use-1 scheme, there is a risk of inter-cell interference depending on the location of the wireless terminal because adjacent cells are transmitting with the same band of frequencies. For example, when a wireless terminal is near a cell boundary of two adjacent cells that is approximately equidistant from the respective BS in each cell, the wireless terminal may not be able to clearly receive transmissions from the BS with which it has been communicating due to interference of the frequencies being used by both cells.

A transmission resource used by the BS in each cell for transmitting between a transmitter and receiver, or vice versa includes one or more transmission blocks in which each transmission block is a time-frequency block that is N discrete frequencies or sub-carriers by M OFDM symbol durations, where M and N are greater than or equal to one. A group of sub-carriers together form a frequency sub-band. In some embodiments, sub-carriers in the sub-band of the first and/or second zone are contiguous sub-carriers. In some embodiments, the sub-carriers in the sub-band of the first and/or second zone are non-contiguous sub-carriers, but are considered to form logical sub-band. Reference to partitioning a transmission resource as described below into first and second zones generally refers to dividing the transmission resource into two groups of one or more transmission blocks each.

According to a first aspect of the invention an OFDM transmission resource is partitioned into a first zone and a second zone. The first zone is allocated for use by all of the cells in the communication environment. This may for example involve transmitting on at least one set of sub-carriers which is used by all of the cells. The second zone is allocated for use by less than all of the cells. This may involve transmitting on at least one set of sub-carriers which is used by less than all of the plurality of cells so as to mitigate inter-cell interference Inter-cell interference between cells is mitigated during the second zone because there is less likelihood of a same sub-band being used for transmission by transmitters of adjacent cells at a same time since the same transmission frequencies are not used in all cells. For example, frequencies in a sub-band that are used by a BS serving a cell and that are not used by adjacent cells mitigate inter-cell interference because the adjacent cells are not transmitting on the same frequencies.

The first zone will be referred to as a normal zone. In this example "normal" refers to the fact that a normal transmission state is being used in this zone which involves all the cells sharing the available bandwidth. In some embodiments, the second zone enables cells to use less than an available bandwidth so that remaining portions of the available bandwidth can be used by adjacent cells. Such a second zone will be referred to as a low inter-cell interference zone. In some embodiments adjacent cells use different portions of the bandwidth in their respective low inter-cell interference zones. However, not necessarily all cells in the communication environment will use unique portions of the total available bandwidth. In a communication environment with a plurality of cells, two cells may use the same portion of bandwidth in their respective low inter-cell interference zone sub-bands, if the two cells are separated by one or more intervening cells so that only an acceptably small amount of inter-cell interference, if any, occurs between the two cells.

According to a second aspect of the invention an OFDM transmission resource is partitioned into a first zone and a second zone. In the first zone a transmission power is used for transmission that is the same transmission power that is used in the first zone of all other cell in the communications environment. In the second zone a transmission power is used that is different than the transmission power used in the first zone of all other cells in the communications environment. Inter-cell interference between cells is mitigated during the second zone for a transmitter serving a cell, for example when one cell of a pair of adjacent cells is transmitting in the second zone with a larger transmission power than the transmission power of the other cell of the pair of adjacent cells, because there is less likelihood of a same transmission power being used for transmission by transmitters of adjacent cells at a same time since the same transmission power is not used in all cells.

In some embodiments, after the OFDM transmission resource is separated into the first zone and the second zone the transmitter of the cell transmits for the first zone using a particular transmission power used by all cells for the first zone and for the second zone a transmission power that can be increased or decreased compared to the transmission power used in the first zone. In some embodiments the zone with the particular transmission power for all cells is considered to be the normal zone as this is the normal transmission power used by all other cells. In some embodiments the zone with a variable transmission power is considered to be the low inter-cell interference zone because using a larger or smaller transmission power than the normal power enables mitigation of inter-cell interference. For example, if a receiver is geographically located at a boundary of two cells, in which the transmission resources of respective transmitters associated with the two cells are synchronized such that first and second zones are aligned, using a larger transmission power in the second zone than the normal transmission power in the first zone for a BS serving the receiver and a transmission power equal to or smaller than the normal transmission power in a BS serving an adjacent cell to mitigate inter-cell interference. Even if transmission frequencies in the two cells are the same for the first and second zones, the larger transmission power in the cell of the serving BS reduces inter-cell interference. In some embodiments the partitioning of the zones can be coordinated between cells so that adjacent cells do not both use a larger transmission power at the same time. In some embodiments, when adjacent cells coordinate the partitioning of zones they also coordinate that the low inter-cell interference zone in one or more of the adjacent cells reduces the transmission power in the corresponding second zone for the one or more adjacent cells. In some embodiments, when a BS is transmitting a low inter-cell interference zone with a transmission power less than that of the normal transmission power, the low inter-cell interference zone is still used to transmit to receivers that are in close proximity to the transmitting BS.

In some embodiments, the second zone can be further partitioned into multiple portions. In some portions the BS may transmit with a transmission power lower than that of the normal transmission power used in the first zone in all cells In some portions the BS may transmit with a transmission power higher than that of the normal transmission power.

In some embodiments, when multiple transmission resources are used by a BS, all of the transmission resources are separated into normal and low inter-cell interference zones. In some embodiments of the invention, when multiple transmission resources are used by a BS, some of the transmission resources are separated into normal and low inter-cell interference zones and other transmission resources may be either entirely normal or entirely low inter-cell interference.

The use of a low inter-cell interference zone in the transmission resource may enable improved coverage in the cell. In some embodiments, the low inter-cell interference zone uses a fractional frequency re-use scheme with coordination of transmitters in other cells to enable improved coverage in the cell. In some embodiments, the low inter-cell interference zone uses a fractional frequency re-use scheme without coordination of transmitters in other cells to enable improved coverage in the cell. In some embodiments, the low inter-cell interference zone uses inter-cell interference avoidance and/or reduction to enable improved coverage in the cell.

With reference to the flow chart in FIG. 2A, a method will now be described for execution in an OFDM communications environment having at least two cells, for allocating transmission resources for the cells. The transmission resource has a time domain and a frequency domain and includes a plurality of OFDM symbols. In some embodiments the method can be used for base stations transmitting to mobile terminals, which is referred to as a downlink transmission. In some embodiments the method can be used for mobile terminals transmitting to base stations, which is referred to an uplink transmission.

A first step S-1 involves partitioning a time-frequency transmission resource comprising a plurality of sub-carriers over a plurality of OFDM symbol intervals into a first zone and a second zone. A second step S-2 involves in the first zone, transmitting on at least one set of sub-carriers which is used by all of the plurality of cells. A third step S-3 involves in the second zone, transmitting on at least one set of sub-carriers which is used by less than all of the plurality of cells so as to mitigate inter-cell interference.

With reference to the flow chart in FIG. 2B, another method will now be described for execution in an OFDM communications environment having at least two cells. A first step S-4 involves partitioning an OFDM transmission resource comprising a plurality of sub-carriers over a plurality of OFDM symbol intervals into a first zone and a second zone. A second step S-5 involves transmitting in the first zone using a transmission power which is used by all of the plurality of cells. A third step S-6 involves transmitting in the second zone using a transmission power which is used by less than all of the plurality of cells so as to mitigate inter-cell interference.

Figure 2A:
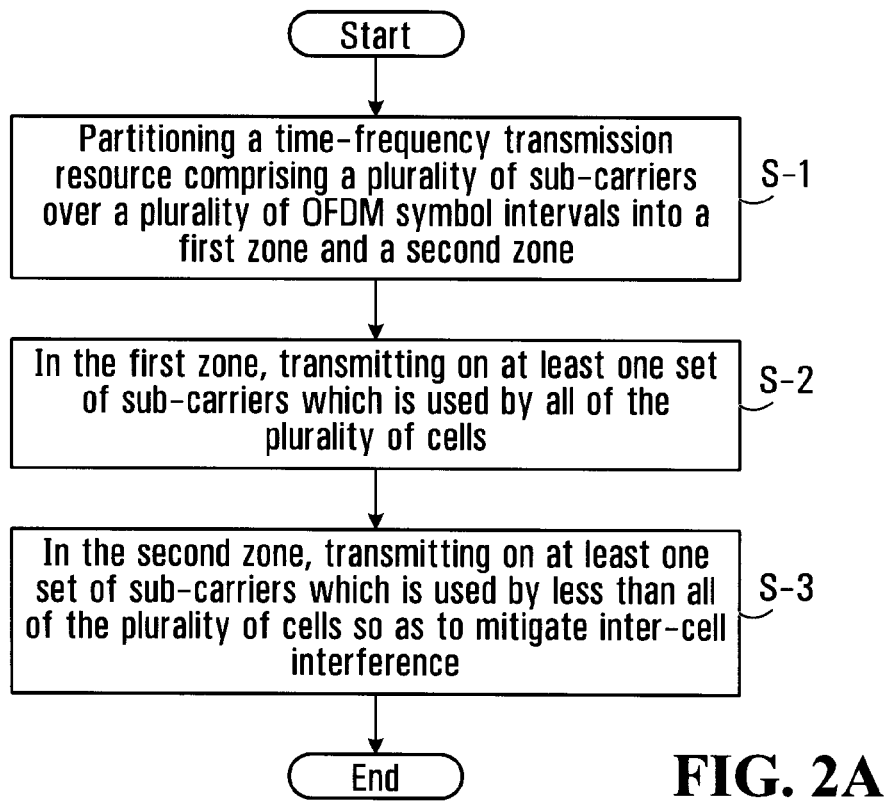
FIG. 2A is a flowchart of a method for allocating transmission resources in cells of a communication environment according to an embodiment of the invention.
Figure 2B:
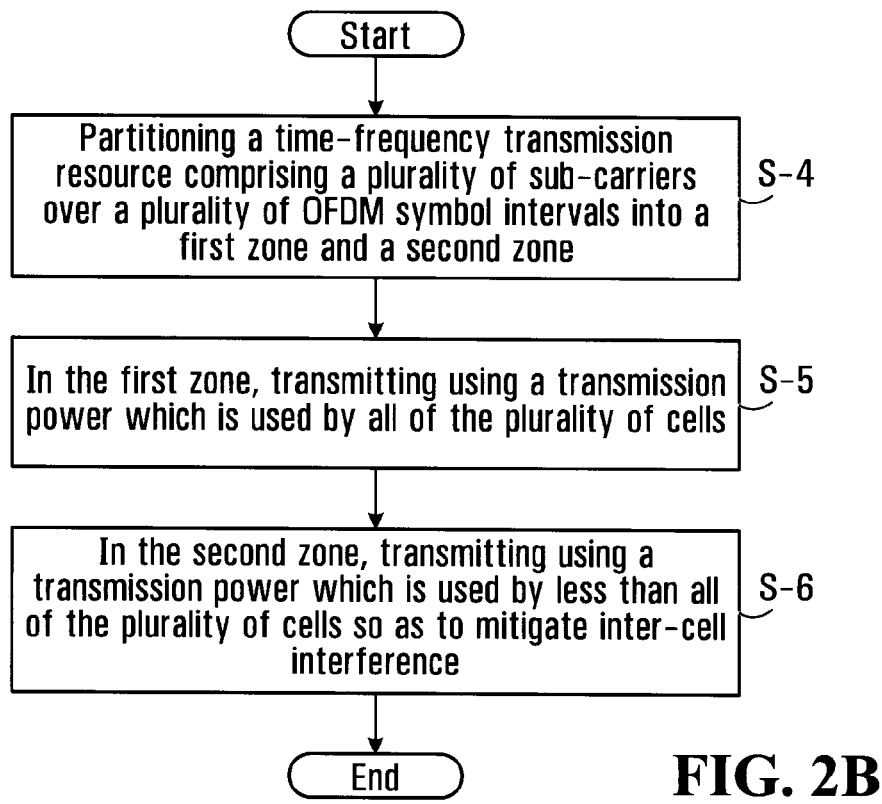
FIG. 2B is a flowchart of a method for allocating transmission resources in cells of a communication environment according to another embodiment of the invention.

The methods of FIGS. 2A and 2B are described with respect to a single cell, but it is to be understood that such methods are occurring in multiple cells of the communications environment.

In some embodiments, the first and second zones are partitioned based on frequency division multiplexing (FDM), as will be described in further detail below with regard to FIGS. 3 and 4. In some embodiments where partitioning is based on FDM, the transmission resource is an allocated channel bandwidth. In some embodiments an entire allocated channel bandwidth is shared by the normal transmission and the low inter-cell interference transmission.

In some embodiments, the first and second zones are partitioned based on time division multiplexing (TDM), as will be described in further detail below with regard to FIGS. 5 and 6. In some embodiments, the first zone includes one or more OFDM symbols in which frequency sub-bands are allocated to all of the cells in the communications environment and the second zone includes one or more OFDM symbols in which frequency sub-bands are allocated to at least one of the cells of the at least two cells. In some embodiments, the first and second zones use different transmission powers. In some embodiments where partitioning is based on TDM, the transmission resource is a transmission time interval (TTI) containing multiple OFDM symbols.

In some embodiments, the normal zone is a frequency re-use-1 zone. In some embodiments the low inter-cell interference zone is a fractional frequency re-use zone.

In some implementations the low inter-cell interference zone is used for transmission to a receiver that is located in close proximity to a boundary between adjacent cells to mitigate inter-cell interference occurring at that location. In some implementations the low inter-cell interference zone is used for transmission to a receiver when a transmitter sends a transmission of high importance in which it is desirable to reduce the inter-cell interference as much as possible.

In some embodiments, partitioning and allocating of the normal and low inter-cell interference zones in the transmission resource is coordinated between transmitters in one or more cells of a synchronized communication environment. In some embodiments the partitioning is coordinated between the cells so that the normal and low inter-cell interference zones are the same size and have the same location in transmission resources in each respective cell. In some embodiments, allocating of the frequency sub-bands in the low inter-cell interference zone is coordinated between the cells so that adjacent cells allocate unique frequencies in the respective sub-bands. In some embodiments the unique frequencies are also different than the frequencies used in the sub-bands of the normal zone. Therefore, in a given cell transmissions in the low inter-cell interference zone of the OFDM transmission resource will have a reduced inter-cell interference because adjacent cells are not transmitting on the same frequencies allocated to the given cell.

In some embodiments, in a given cell, transmissions in the low inter-cell interference zone of the transmission resource will have a reduced inter-cell interference when adjacent cells are not transmitting at the same transmission power as the given cell.

In some embodiments the partitioning and allocating of the normal and low inter-cell interference zones is performed independently, with no coordination between cells in the communication environment, for example in an asynchronous communication environment. Without coordination between cells, it is possible that the locations of the normal and low inter-cell interference zones may not coincide in OFDM transmission resources for respective cells. In some embodiments without coordination between the cells, the low inter-cell interference zones of adjacent cells use the same frequencies for sub-bands, but due to the random allocation of sub-bands inter-cell interference there is still a high likelihood of reduced inter-cell interference compared to if a normal zone was used for transmission. In some embodiments, if transmission power selection for the zones is not coordinated between the cells, the low inter-cell interference zones of adjacent cells use the same transmission powers, but due to the random location of the zones in the transmission resource, inter-cell interference there is still a high likelihood of reduced inter-cell interference compared to if a normal zone was used for transmission.

In some embodiments, the above-described methods can be used for conventional OFDM. However, the invention is not intended to be limited to only convention OFDM. In some embodiments of the invention other forms of OFDM, such as transformed OFDM are utilized. Several examples of transformed OFDM are included in applicant's co-pending international patent application PCT/CA2006/000464 filed on Mar. 30, 2006, which is hereby incorporated in its entirety by reference.

Various examples of OFDM frames having particular time-frequency patterns with zone partitioning formed using the methods described above will be described in detail below with regard to FIGS. 3 to 10.

Figure 3:
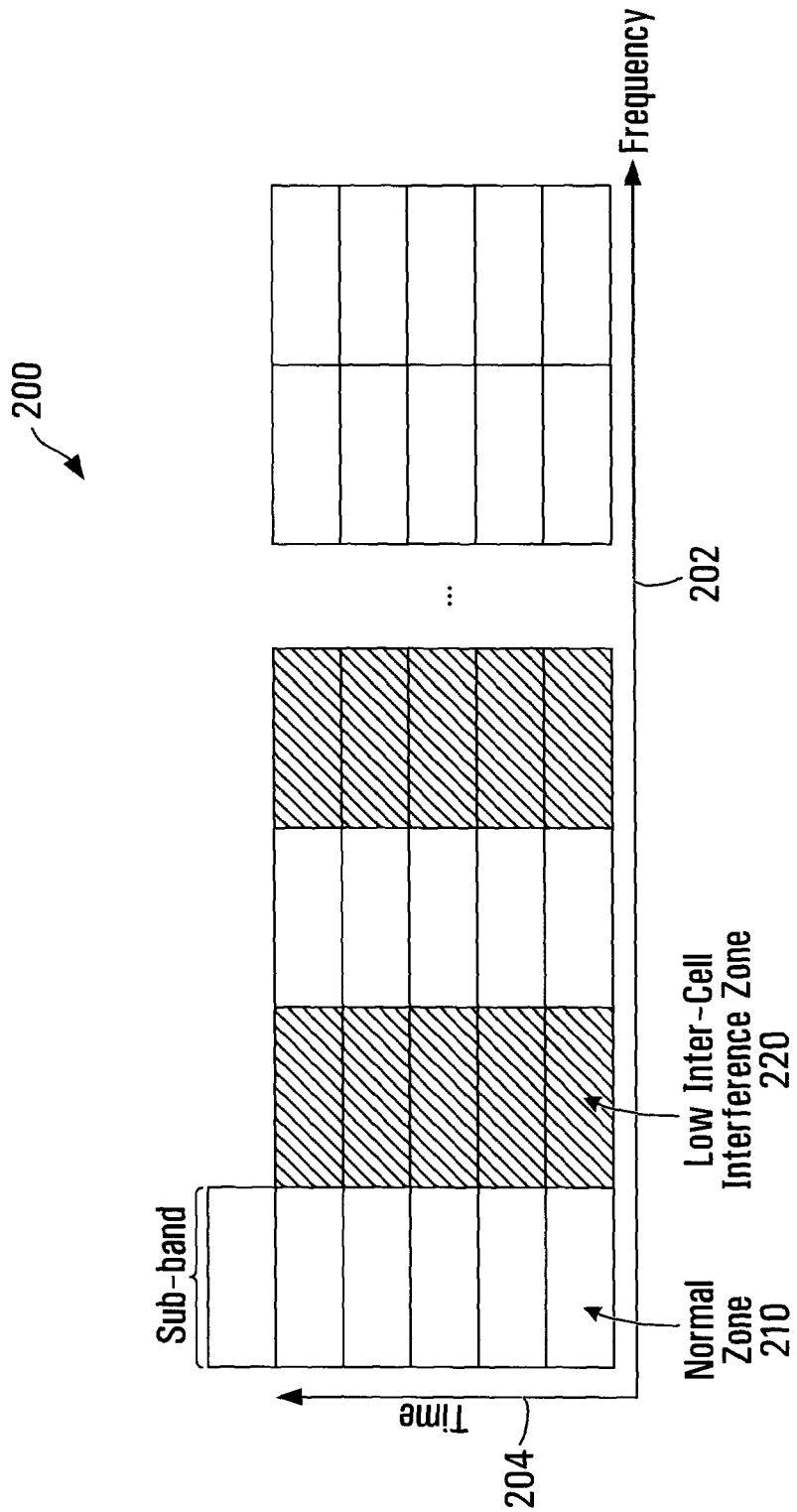
FIG. 3 is a schematic diagram of a frequency division multiplexing (FDM) Based Zone Partition arrangement in which at least one zone enables reduced inter-cell interference with respect to other zones according to an embodiment of the invention.

FIG. 3 shows an example frequency division multiplexing (FDM) Based Zone Partition pattern 200 for a transmission resource employed for transmitting data and pilot symbols. The FDM Based Frame Partition pattern 200 is shown having a two dimensional appearance in which the horizontal direction 202 is frequency and the vertical direction 204 is time. Each discrete vertical column represents a sub-band of multiple sub-carriers. Each discrete horizontal row represents one or more OFDM symbols.

The FDM Based Zone Partition pattern 200 is shown partitioned into a first zone 210 and a second zone 220. Each zone is formed of a sub-band including a plurality of sub-carriers assigned to multiple OFDM symbols. In some embodiments, in the first zone 210 all the sub-bands of an available frequency bandwidth are used by all the cells for transmission of the OFDM symbols. In the second zone 220 each of the sub-bands of the available frequency bandwidth are used by some of the cells, but not all of the cells, for transmission of the OFDM symbols. In some embodiments, the sub-carriers in the sub-band of the first and/or second zone are contiguous sub-carriers. In some embodiments, the sub-carriers in the sub-band of the first and/or second zone are non-contiguous sub-carriers. In a transmission resource that includes multiple occurrences of the first and/or second zones, the multiple occurrences are collectively referred to as being a first zone and a second zone, respectively.

In some embodiments, the FDM Based Zone Partition pattern 200 is used for frequency re-use-1 transmission in the first zone 210 and fractional frequency re-use transmission in the second zone 220.

In FIG. 3 the transmission resource has first and second zones 210,220 of the same size, alternating one after another in the frequency direction, however it is to be understood that the arrangement of the zones is implementation specific. In some implementations the different zones have sub-bands with a different number of sub-carriers. In some embodiments the arrangement of zones is allocated based on the particular usage of normal and low inter-cell interference zones used by the transmitter. In some embodiments the bandwidth of sub-bands in the normal and low inter-cell interference zones of the transmission resource are dynamically configurable. Once the bandwidth of respective sub-bands is set in the transmission resource the bandwidth of the respective sub-bands remain the same until they are reconfigured.

The transmission resource of FIG. 3 can be used to transmit one or more of pilot information, control channel information and data, none of which are specifically illustrated in FIG. 3.

Figure 4:
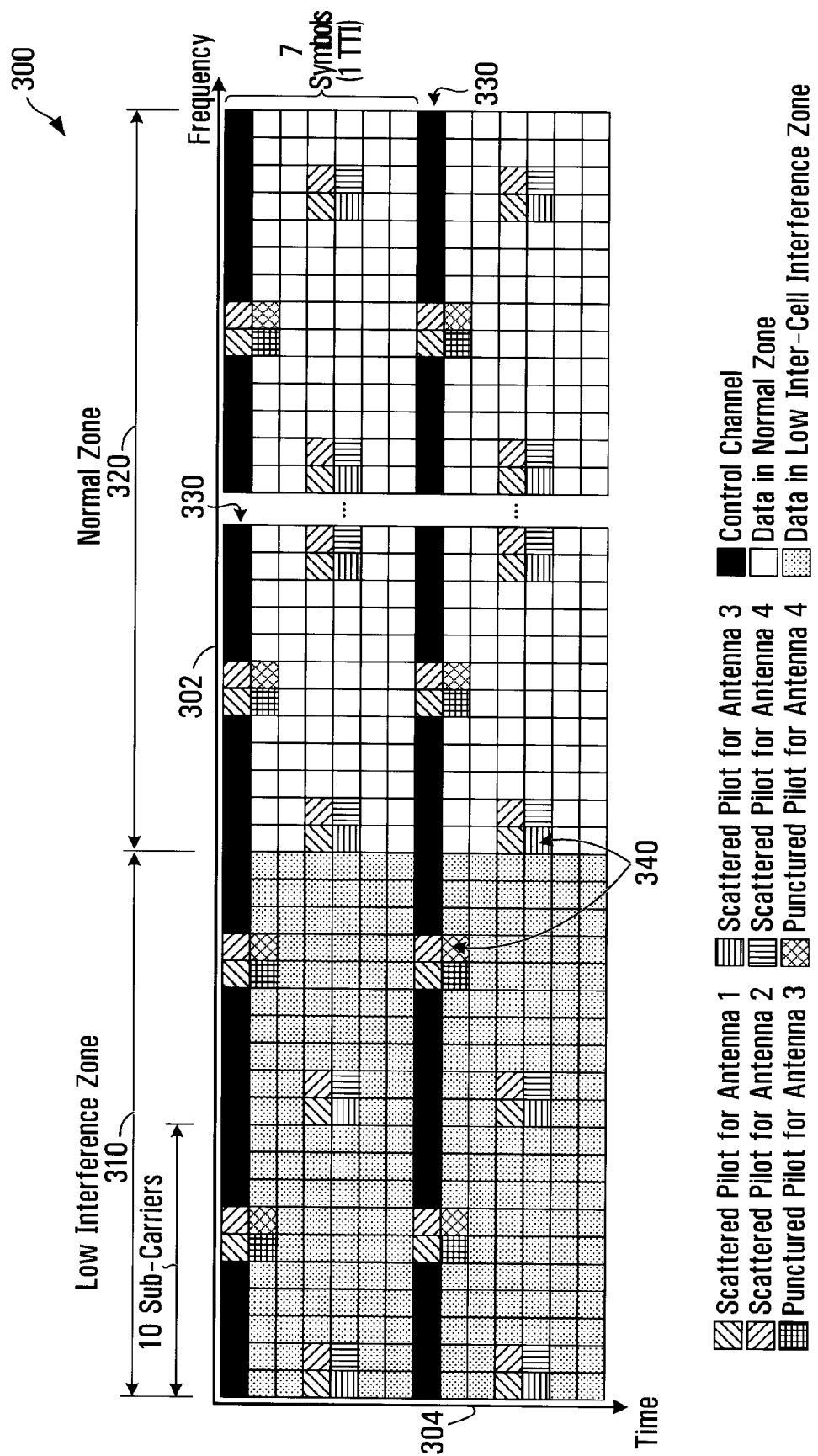
FIG. 4 is a schematic diagram of a FDM Based Zone Partition arrangement for transmission according to another embodiment of the invention.

FIG. 4 shows an example FDM Based Zone Partition pattern 300 for a transmission resource employed for transmitting data and pilot symbols by a transmitter with four antennas. The FDM Based Zone Partition pattern 300 is shown having a two dimensional appearance in which the horizontal direction 302 is frequency and the vertical direction 304 is time. Each discrete vertical column represents a single sub-carrier. Each discrete horizontal row represents an OFDM symbol.

The example FDM Based Zone Partition pattern 300 shows the combined data and pilot pattern for all four antennas. A pattern transmitted by a given antenna includes the data in locations common to all the antennas and pilot symbols for transmission only by the given antenna. A grouping of pilot symbols shown in FIG. 4 would, for example be represented in a given antenna pattern by the pilot symbol for the given antenna and null symbol locations for each other antenna. The data and pilots in each zone may be intended for one or more receivers that are currently within the cell of the transmitter.

The FDM Based Zone Partition pattern 300 illustrates the transmission resource partitioned into a first zone 310 and a second zone 320. The first zone 310 is used for low inter-cell interference transmission and is referred to a low inter-cell interference zone. The second zone 320 is for normal transmission and is referred to as a normal zone, where "normal" has been defined above.

In some embodiments, in the low inter-cell interference zone each of the sub-bands of the allocated frequency bandwidth are used by some of the cells, but not all of the cells, for transmission of the OFDM symbols. In some embodiments, in the normal zone all the sub-bands of the allocated frequency bandwidth are used by all the cells for transmission of the OFDM symbols.

In some embodiments the low inter-cell interference zone is a fractional frequency re-use zone. In some embodiments the normal zone is a frequency re-use-1 zone.

The FDM Based Zone Partition pattern 300 has multiple transmission blocks in the first zone 310 and in the second zone 320. In the illustrated example, a transmission block is considered to be a time-frequency block having a sub-band of ten sub-carriers for a duration of seven OFDM symbols. The seven symbol duration is indicated in FIG. 4 to be a transmission time interval (TTI). The first zone 310 is formed from two low inter-cell interference transmission blocks adjacent in the frequency direction. The second zone 320 is formed from multiple normal transmission blocks adjacent in the frequency direction. In the illustrated example pattern of transmission blocks having the same sized sub-bands in each zone is shown to repeat once in the time direction.

The size of the transmission block is implementation specific and is not meant to be limited to the illustrated example of a sub-band of ten sub-carriers having a duration of seven OFDM symbols. Furthermore, the number of transmission blocks forming each of the low inter-cell interference and normal zones is implementation specific and may be greater than or less than that shown in the respective low inter-cell interference zone and the normal zone of FIG. 4.

In some embodiments multiple low inter-cell interference and normal zones may be included in the OFDM transmission resource in an alternating pattern. In some embodiments each zone of the alternating pattern of low inter-cell interference and normal zones have a different number of transmission blocks per zone. Similarly, in the time direction the period of the pattern is implementation specific and may include a period having any number of OFDM symbols.

In some embodiments, the transmission blocks of the low inter-cell interference zone and normal zone each comprise an odd number of OFDM symbols per block, in accordance with 3GPP TR 25.814 v0.1.1 (June 2005). More generally, the number of OFDM symbols is implementation specific and may be more or less than the seven OFDM symbols shown in FIG. 4.

FDM Based Zone Partition pattern 300 may allocate certain portions of the transmission resource as control channels, generally indicated at 330. The control channel 330 is used for transmitting information from the transmitter to the receiver pertaining to controlling the link between the transmitter and receiver. For example, the control channel may include, but is not limited to, information such as synchronization information and downlink (DL) or uplink (UL) multiplexing access profile (MAP) information. FDM Based Zone Partition pattern 300 has two OFDM symbols allocated as control channels 330. One control channel 330 is shown to occur in the first OFDM symbol of each transmission block in both the low inter-cell interference and normal zones, but it is to be understood that this is not meant to limit the invention. For example, the control channel may occur in some, but not all of the transmission blocks. The remainder of the OFDM symbols in each transmission block include data and pilots to be transmitted from a transmitter to one or more receivers. It is to be understood that the position of the control channel in the transmission block is implementation specific and is not limited to the first OFDM symbol location as shown in FIG. 4.

In some embodiments, the control channel may be located in the same location of each transmission block for each zone in the FDM Based Zone Partition pattern. In some embodiments, the control channel may be located in a different location of the transmission block for the low inter-cell interference and normal zones in the FDM Based Zone Partition pattern. In some embodiments, in the low inter-cell interference and normal zones the control channel may be located at a different position in one or more transmission blocks of the transmission resource.

While only one control channel is shown in each transmission block of the illustrated example, it is to be understood that in some embodiments the number of control channels is dependent upon the size of the transmission blocks in a transmission resource. In some embodiments, the control channel is only transmitted in transmission blocks of the low inter-cell interference zone. In some embodiments, the control channel is only transmitted in transmission blocks of the normal zone.

The FDM Based Zone Partition pattern 300 includes groupings of four pilot symbols 340, one pilot symbol for each antenna. For each transmission block, either in the low inter-cell interference zone or the normal zone, FIG. 4 shows two groupings of pilot symbols 340. The groupings of pilot symbols, are shown to be a two sub-carrier by two OFDM symbol duration (or a two-by-two time-frequency) block. It is to be understood by those skilled in the art that other patterns for the grouping of pilot symbols may be used. For example, other patterns may include a single sub-carrier by four symbol duration block or a four sub-carrier by single symbol duration block. In some embodiments a grouping of pilot symbols is one in which only some of the pilot symbols are directly adjacent to one another. In some embodiments a grouping of pilot symbols is one in which none of the pilot symbols are directly adjacent to one another.

For the grouping of pilot symbols that has two pilot symbols in the first OFDM symbol of the transmission block and two pilot symbols in the second OFDM symbol, data symbols in the data symbol portion are removed and replaced with pilot information of the grouping of pilot symbols. The receiver receiving the pattern has to rely on error correction coding to recover the entire transmitted data content. This is shown for certain location for the third and fourth antennas. Specifically, in the second OFDM symbol of each transmission block.

It is to be understood that the location and number of the groupings of pilot symbols per transmission block, and more generally in the transmission resource are not to be limited by the illustrated example, as the location and number of the groupings of pilot symbols is implementation specific.

FIG. 4 is described as being for a transmitter with four antennas. It is to be understood that a four antenna transmitter is a particular example and not meant to limit the scope of the invention. The number of antennas in a transmitter is an implementation specific variable. In some embodiments of the invention the FDM based zone partition pattern for mitigating inter-cell interference concept can be applied to any number of antenna equal to or greater than one. In some embodiments the number of pilot symbols in a grouping in the FDM Based Zone Partition patterns is dependent on the number of antennas in the transmitter.

In the illustrated example of FIG. 4 the groupings of pilot symbols 340 are inserted in a diamond lattice pattern. As a result, in the illustrated example four of every seven OFDM symbols include pilot symbols. However, it is to be understood that depending on the number of pilot symbols inserted in the transmission resource the ratio of OFDM symbols having pilot symbols to OFDM symbols not having pilot symbols may vary.

To insert the groupings of pilot symbols in a diamond lattice pattern, a grouping of pilot symbols is inserted at each of a first subset of frequencies. The frequencies within the first subset of frequencies are spaced equally apart by a pilot spacing. At some later time, a grouping of pilot symbols is inserted at each of a second subset of frequencies. The frequencies within the second subset of frequencies are shifted from the frequencies within the first subset of frequencies by half of the pilot spacing within the frequency direction. Groupings of pilot symbols are inserted in the transmission resource alternating between the first subset of frequencies and the second subset of frequencies.

A different pilot pattern can be used, as long as the same pilot pattern is used for each of the pilot symbols corresponding to a particular antenna of the grouping of pilot symbols, and as long as the pilot patterns for the encoded pilot symbols are offset from each other in the time direction of the OFDM frame. For example, a regular diagonal lattice pattern may be used; the diamond shaped lattice being a special case of this. More generally, any staggered pattern of pilot symbols can be used.

In some embodiments a same pilot pattern in the normal zone may be used between transmitters in neighbouring cells. In some embodiments a same pilot pattern in the low inter-cell interference zone may be used between transmitters in neighbouring cells.

In some embodiments, the pattern of pilot symbols of transmission resources of respective cells in the communications environment is the same, but patterns for respective cells are shifted in time and/or frequency with respect to one another.

In some embodiments the sub-band assignments for normal transmission and low inter-cell interference transmission may be changed according to the ratio of normal traffic and low inter-cell interference traffic. In some embodiments the sub-band assignments for normal transmission and low inter-cell interference transmission may be changed according to the percentage of the traffic to receivers on a cell boundary and/or the percentage of the highly important traffic to receivers that cannot tolerate high levels of inter-cell interference.

Figure 5:
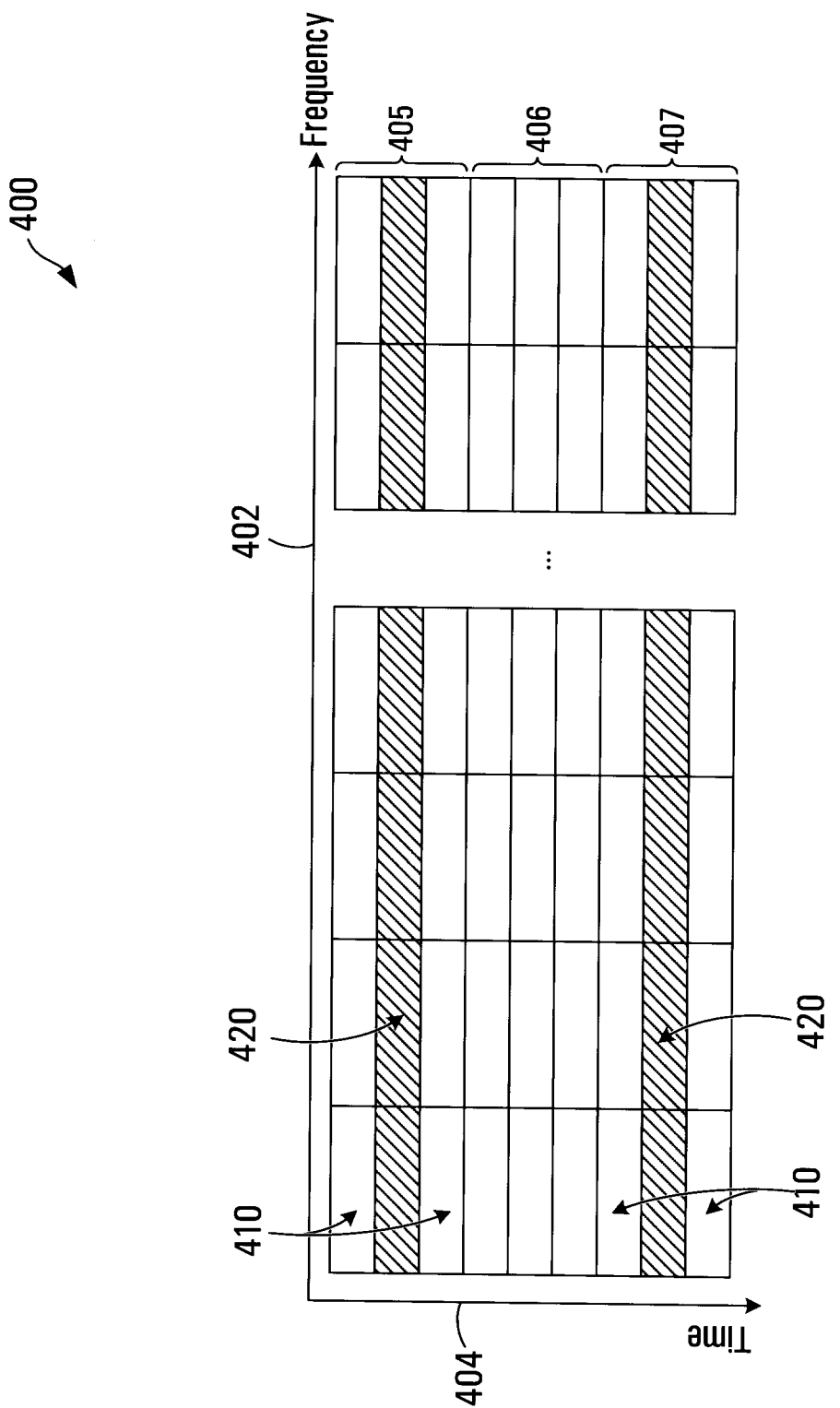
FIG. 5 is a schematic diagram of a time division multiplexing (TDM) Based Zone Partition arrangement in which at least one zone enables reduced inter-cell interference with respect to other zones according to an embodiment of the invention.

FIG. 5 shows an example time division multiplexing (TDM) Based Zone Partition pattern 400 for a transmission resource employed for transmitting data and pilot symbols. The TDM Based Zone Partition pattern 400 is shown having a two dimensional appearance in which the horizontal direction 402 is frequency and the vertical direction 404 is time. Each discrete vertical column represents a frequency sub-band having one or more sub-carriers. Each discrete horizontal row represents one or more OFDM symbols.

FIG. 5 illustrates an embodiment in which the transmission resource contains three transmission time intervals (TTI) 405, 406,407 each having the same allocated frequency bandwidth and in which each TTI includes multiple OFDM symbols. In FIG. 5, the first and third TTI 405,407 are each partitioned into a first zone 410 for normal transmission and a second zone 420 for low inter-cell interference transmission. The second TTI is not partitioned and is only for normal transmission. In some embodiments, in the first zone 410 allocated for normal transmission, all the sub-bands of the available frequency bandwidth are used by all the cells in the communications environment for transmission of the OFDM symbols in the first zone 410. In some embodiments, in the second zone 420 allocated for low inter-cell interference transmission each of the sub-bands of the available frequency bandwidth are used by some of the cells, but not all of the cells, for transmission of the OFDM symbols in the second zone 420. For example, in some embodiments transmitters of adjacent cells may not use the same sub-band of frequencies in their respective transmission resource low inter-cell interference zones.

In some embodiments, in the first zone 410 allocated for normal transmission all the sub-bands of the available frequency bandwidth transmit with a same transmission power in all the cells. In some embodiments, in the second zone 420 allocated for low inter-cell interference transmission each of the sub-bands of the available frequency bandwidth transmit with a different transmission power than that of the first zone in all the cells. For example, for a pair of adjacent cells that have synchronized transmission resources, it is coordinated that a transmitter in a serving cell will transmit in a second zone with a larger transmission power than a transmitter in an adjacent cell will transmit in a corresponding second zone. In some cases, the second cell will reduce its transmission power in the corresponding second zone to further reduce the inter-cell interference of adjacent cells. For a pair of adjacent cells that do not have synchronized transmission resources, a transmitter in a serving cell will transmit in a second zone with a larger transmission power than a transmitter in an adjacent cell will transmit in a first zone. Occasionally in a non-synchronized communication environment, low inter-cell interference zones in adjacent cells with larger transmission powers will coincide at the same time. However, if a ratio of low inter-cell interference zone size to normal zone size is small in a majority of cells, for example approximately 0.1 or less, a likelihood of inter-cell interference is generally still mitigated.

In the illustrated example, the TDM Based Zone Partition pattern 400 has multiple transmission blocks in the first zone 410 and multiple transmission blocks in the second zone 420. More generally, the number of transmission blocks in each zone is implementation specific and may be greater than or less than that which is shown in the respective normal and low inter-cell interference zones of FIG. 5.

In the illustrated example of FIG. 5 the low inter-cell interference zone in both the first and third TTI are the only low inter-cell interference zones in the respective TTI, and both are preceded and followed by a normal zone. It is to be understood that this is merely an example of the partitioning of the first and second zones in a TTI and other partitioning patterns for TTI into normal and low inter-cell interference zones is within the scope of the invention.

In some embodiments the partition of the zones could be TTI based. For example, assigning one or more TTIs for normal zone transmission and one or more TTIs for low inter-cell interference zone transmission.

In some embodiments the TTIs in the transmission resource each have an equal duration. For example, a frame having a duration equal to 10 ms may include five TTIs, which are each 2 ms in duration. In some embodiments the partitioning of the TTI into normal and low inter-cell interference zones is dynamically configurable. In some embodiments, once the partitioning of zones within the TTIs is set the size of the normal and low inter-cell interference zones remains the same until they are reconfigured.

In some embodiments, the normal zone is a frequency re-use-1 zone. In some embodiments the low inter-cell interference zone is a fractional frequency re-use zone.

Figure 6:
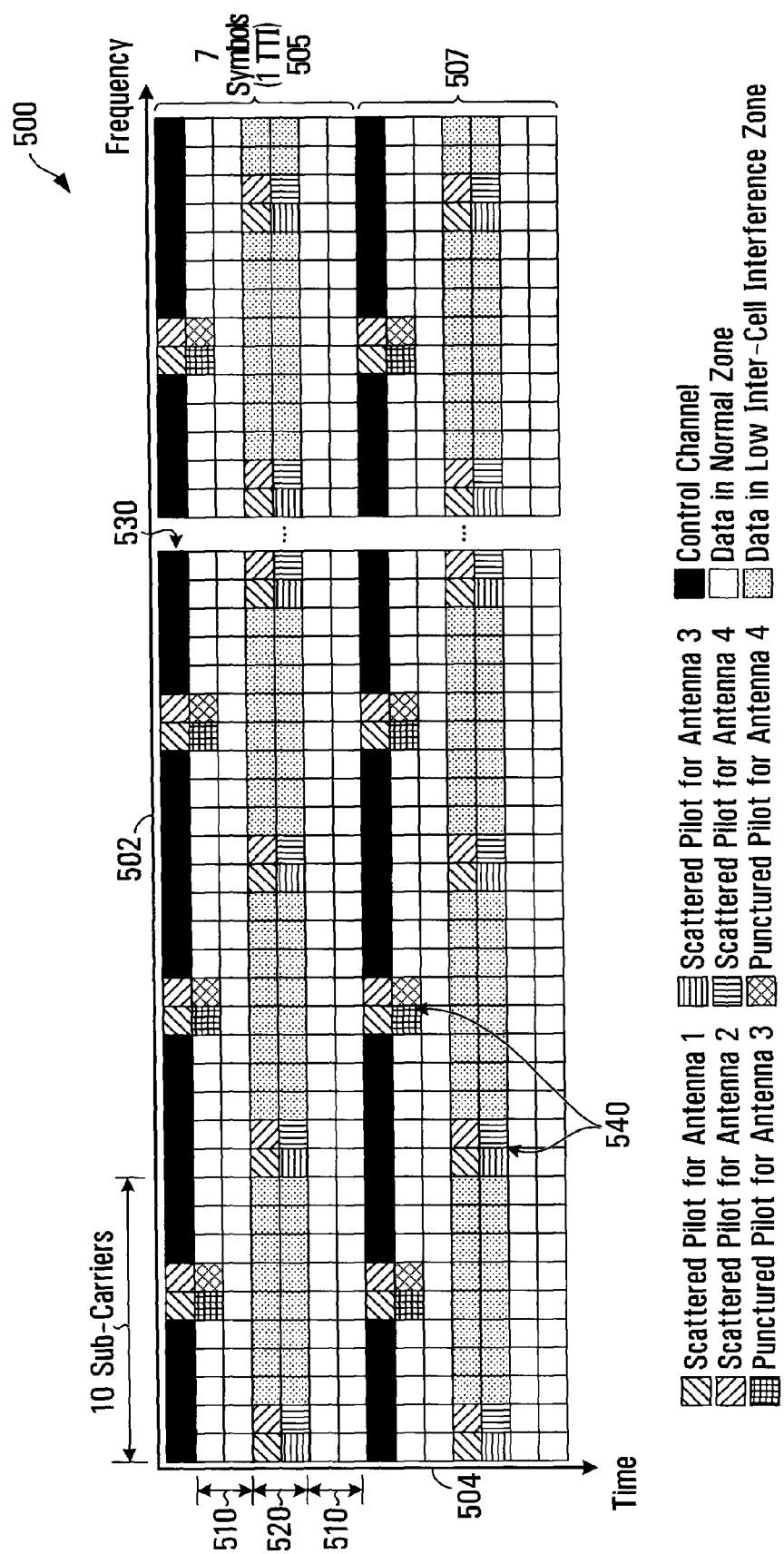
FIG. 6 is a schematic diagram of a TDM Based Zone Partition arrangement for transmission according to an embodiment of the invention.

FIG. 6 shows an example TDM Based Zone Partition pattern 500 for a transmission resource employed for transmitting data and pilots by a transmitter with four antennas. The TDM Based Zone Partition pattern 500 is shown having a two dimensional appearance in which the horizontal direction 502 is frequency and the vertical direction 504 is time. Each vertical column represents a single sub-carrier. Each horizontal row represents an OFDM symbol.

The example TDM Based Zone Partition pattern 500 shows the combined data and pilot pattern for all four antennas. A pattern transmitted by a given antenna includes the data in locations common to all the antennas and pilot symbols for transmission only by the given antenna. A grouping of pilot symbols shown in FIG. 6 would, for example be represented in a given antenna pattern by the pilot symbol for the given antenna and null symbol locations for each other antenna. The data and pilots in each zone may be intended for one or more receivers that are currently within the cell of the transmitter.

FIG. 6 illustrates an embodiment of the invention in which a first zone 510 is shown to be for normal transmission and a second zone 520 is shown to be for low inter-cell interference transmission. In FIG. 6, the transmission resource contains two TTI 505,507, in which each TTI includes seven OFDM symbols. Each TTI has multiple transmission blocks each having a sub-band of ten sub-carriers. The first and second TTI are each partitioned into the first zone 510 for normal transmission and the second zone 520 for low inter-cell interference transmission.

In some embodiments, in the first zone 510 all the sub-bands of the available frequency bandwidth are used by all the cells for transmission of the OFDM symbols in the first zone 510. In some embodiments, in the second zone 520 each of the sub-bands of the available frequency bandwidth are used by some of the cells, but not all of the cells, for transmission of the OFDM symbols.

In some embodiments, in the first zone 510 all the sub-bands allocated for normal transmission are transmitted with a same transmission power in all the cells. In some embodiments, in the second zone 520 all the sub-bands allocated for low inter-cell interference transmission are transmitted with a different transmission power than that of the first zone in all the cells.

In some embodiments, the TTI comprise an odd number of OFDM symbols in accordance with 3GPP TR 25.814 v0.1.1 (June 2005). More generally, the number of OFDM symbols per TTI is implementation specific and may be more or less than the seven OFDM symbols that are shown in the TTI of FIG. 6.

FIG. 6 illustrates that a first OFDM symbol in each TTI is a control channel 530. The control channel 530 may be used for transmitting information from the transmitter to the receiver pertaining to controlling the link between the transmitter and receiver. For example, the control channel may include, but is not limited to, synchronization information and DL or UL MAP information. The remainder of the six OFDM symbols include data to be transmitted from the transmitter to the receiver.

It is to be understood that the position of the control channel is implementation specific and is not limited to a first OFDM symbol location as shown in FIG. 6. In some embodiments, the control channel is located at the same location of the TTI for each TTI. In some embodiments, the control channel is located in a different location of the TTI than in other TTI. While only two control channels are shown in FIG. 6 it is to be understood that this is not meant to limit the scope of the invention as the number of control channels is implementation specific.

The TDM Based Zone Partition pattern 500 includes groupings of four pilot symbols 540, one symbol for each antenna. In the illustrated example, each seven OFDM symbol by ten sub-carrier transmission block contains two groupings of pilot symbols 540. The groupings of pilot symbols 540 are shown to be a two sub-carrier by two symbol duration block. It is to be understood by those skilled in the art that other patterns for the grouping of pilot symbols may be used. For example, other patterns may include a single sub-carrier by four symbol duration block or a four sub-carrier by single symbol duration block. In some embodiments a grouping of pilot symbols is one in which only some of the pilot symbols are directly adjacent to one another. In some embodiments a grouping of pilot symbols is one in which none of the pilot symbols are directly adjacent to one another.

In the illustrated example there are two groupings of pilot symbols 540 per transmission block. If is to be understood that the number of pilot symbol groupings is implementation specific and not to be limited by the illustrated example.

For the grouping of pilot symbols that has two pilot symbols in the first OFDM symbol of the transmission block and two pilot symbols in the second OFDM symbol, data symbols in the data symbol portion are removed and replaced with pilot symbols. The receiver receiving the pattern has to rely on error correction coding to recover the entire transmitted data content. This is shown for certain location for the third and fourth antennas. Specifically, in the second OFDM symbol of each transmission block.

In the illustrated example the groupings of pilot symbols 540 are inserted in a diamond lattice pattern. Based on the particular placement of groupings of pilot symbols in FIG. 6 four of every seven OFDM symbols carry pilot symbols. However, it is to be understood that depending on how pilot symbols are inserted in the TTI the ratio of OFDM symbols having pilot symbols to OFDM symbols not having pilot symbols may vary.

The diamond lattice pattern can be achieved in a similar manner as described above with regard to the FDM case. More generally, any staggered pattern of pilot symbols can be used. In some embodiments the groupings of pilot symbols are close enough together to ensure that there is time coherence and/or frequency coherence. Time coherence occurs when pilot symbols in the time direction are close enough in proximity that channel characteristics are substantially the same at the two points in time within an acceptable tolerance. Frequency coherence occurs when pilot symbols in the frequency direction are close enough in proximity that channel characteristics are substantially the same at two sub-carriers within an acceptable tolerance.

A different pilot pattern can be used, as long as the same pilot pattern is used for each of the pilot symbols corresponding to a particular antenna of the grouping of pilot symbols.

FIG. 6 is described as being for a transmitter with four antennas. It is to be understood that a four antenna transmitter is a particular example and not meant to limit the scope of the invention. The number of antennas in a transmitter is an implementation specific variable. In some embodiments of the invention the TDM based zone partition pattern for mitigating inter-cell interference concept can be applied to any number of antenna equal to or greater than one. In some embodiments the number of pilot symbols in a grouping in the TDM Based Zone Partition patterns is dependent on the number of antennas in the transmitter.

Figure 7:
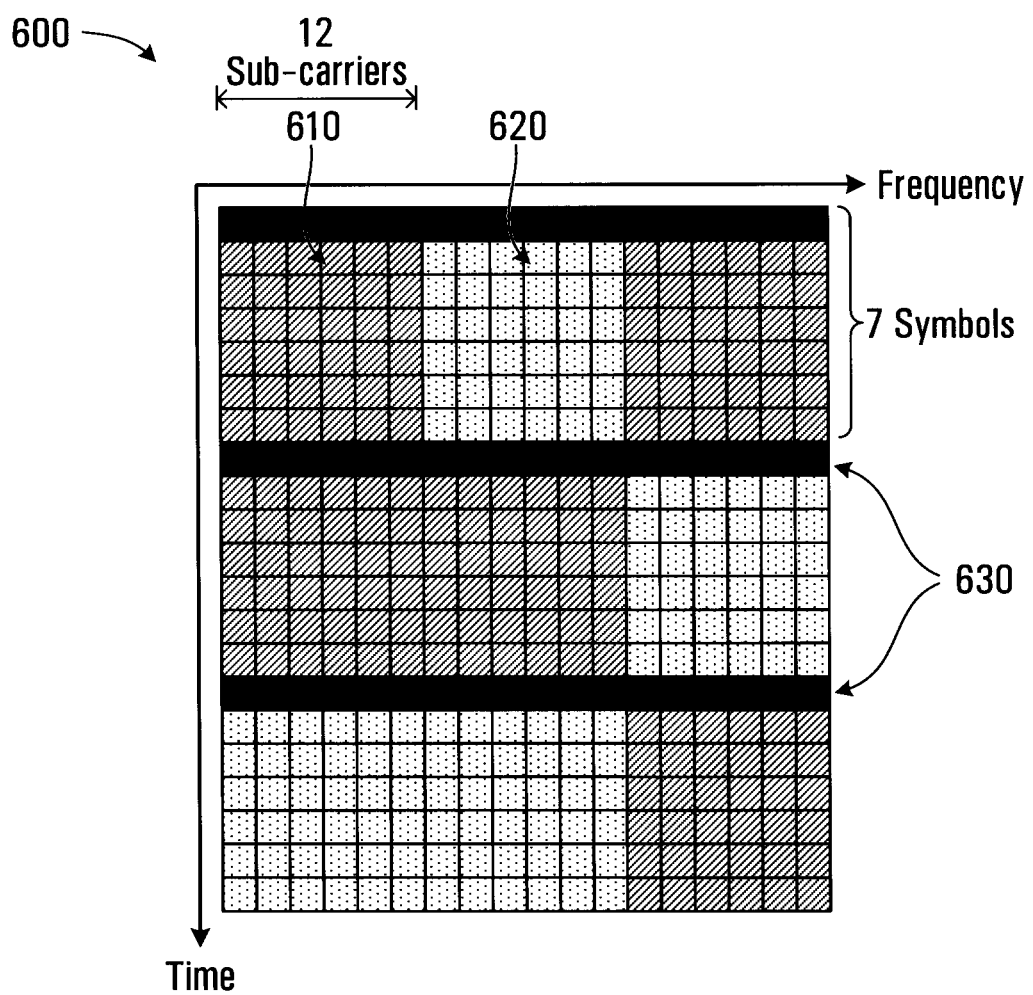
FIG. 7 is a schematic diagram of a TDM/FDM Based Zone Partition arrangement in which at least one zone enables reduced inter-cell interference with respect to other zones according to an embodiment of the invention.

While FIGS. 4 and 6 have generally been used to describe TDM Based Zone Partition patterns and FDM Based Zone Partition patterns respectively, it is to be understood that in some embodiments a combined TDM/FDM Based Zone Partition pattern is also considered to be within the scope of the invention. FIG. 7 illustrates an example of a combined TDM/FDM Based Zone Partition pattern in which an OFDM transmission resource is partitioned into a normal zone and a low inter-cell interference zone for transmitting data and pilot symbols.

The combined TDM/FDM Based Zone Partition pattern 600 is shown having a two dimensional appearance in which the horizontal direction is frequency and the vertical direction is time. Each discrete vertical column represents a single sub-carrier. Each discrete horizontal row represents an OFDM symbol.

The TDM/FDM Based Zone Partition pattern 600 is formed of multiple transmission blocks that are twelve sub-carriers by seven OFDM symbols. FIG. 7 illustrates an embodiment in which each transmission block is allocated as one of a first zone 610 for normal transmission and a second zone 620 for low inter-cell interference transmission. More generally, the number of sub-carriers and OFDM symbols forming a transmission block is implementation specific and may be more or less than the twelve sub-carriers and/or seven OFDM symbols shown in FIG. 7. Furthermore, the allocation of respective zones in the combined TDM/FDM Based Zone Partition pattern is implementation specific.

In some embodiments the low inter-cell interference zone uses a fractional frequency re-use scheme together with pilot patterns having a similar spacing of groupings of pilot symbols, but the grouping of pilot symbols are shifted in time and/or frequency for different pattern.

In some embodiments each cell selects a pattern based on its cell identification (cell ID).

In some embodiments, a pattern of pilot symbols for transmission resources of respective cells in the communications environment is the same, but the pattern is shifted in time and/or frequency for different respective cells.

In some embodiments, implementing a fractional frequency re-use scheme for the transmitter includes transmitting at least one of channel control information, data, and pilot symbol information in M locations of an OFDM symbol and nulls in N locations of the OFDM symbol, in which the OFDM symbol has M+N locations, where the nulls are used for at least one of channel control information, data, and pilot symbol information in other cells of the plurality of cells.

Examples shifted patterns with fraction frequency re-use are shown in FIGS. 8A, 8B, 9A and 9B.

Figure 8A:
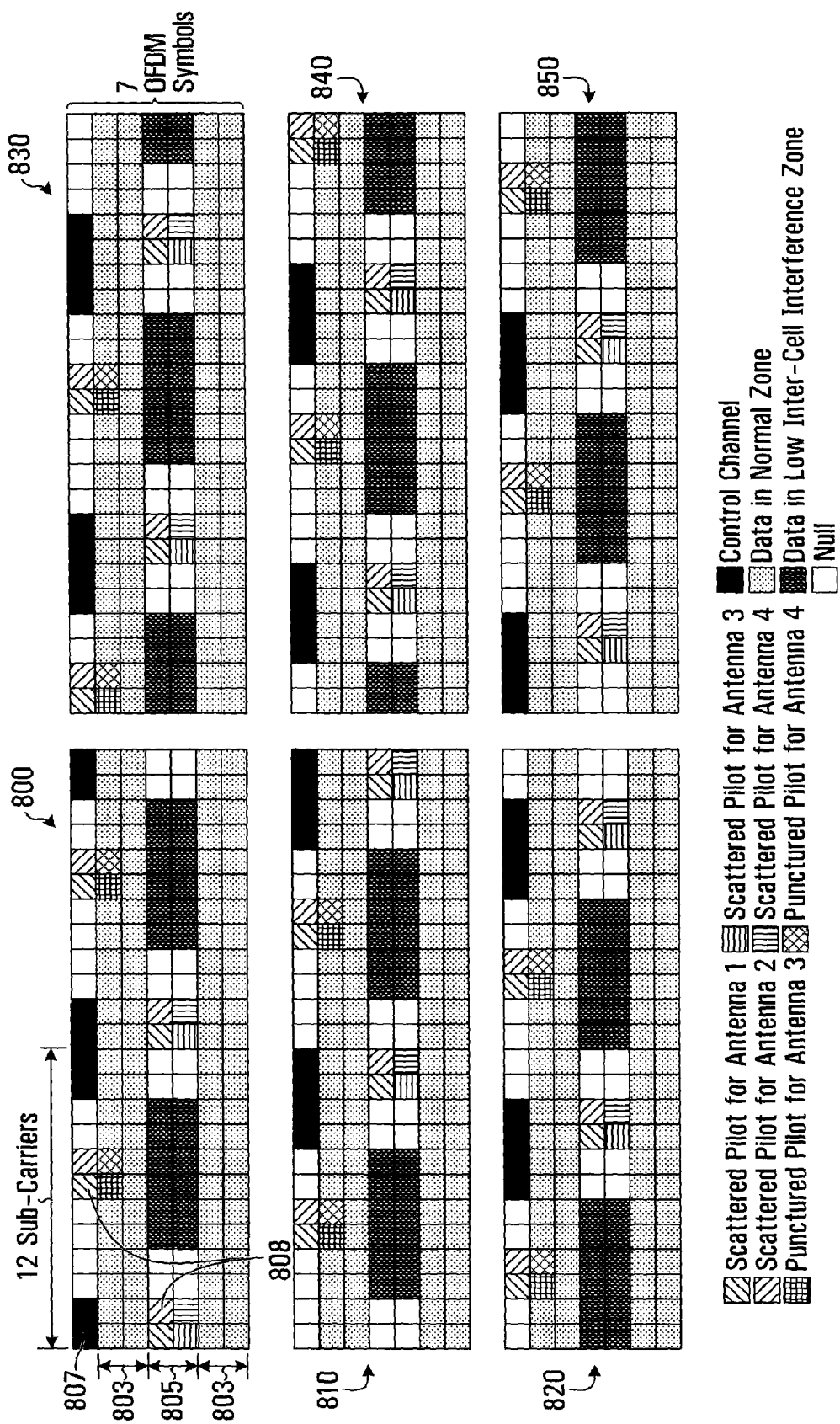
FIG. 8A contains schematic diagrams of pilot patterns for a TDM Based Zone Partition arrangement that incorporate pilot pattern shifting according to an embodiment of the invention.

FIG. 8A illustrates six patterns 800,810,820,830,840,850 for groupings of pilot symbols in different locations for transmission resources that could be used by different cells in a communications environment. Each of the six patterns contains two contiguous TDM based transmission blocks each having sub-bands containing twelve sub-carriers over one TTI having a duration of seven symbols. In each pattern the TTI is partitioned into a first zone, generally indicated at 803 and a second zone, generally indicated at 805. The first zone 803, which is allocated for normal transmission occupies second, third, sixth and seventh OFDM symbols. In some embodiments, in the first zone 803, or normal zone, all sub-carriers are allocated for use by all cells. In some embodiments, the second zone 805, which is allocated for low inter-cell interference transmission occupies fourth and fifth OFDM symbols. In the second zone 805, or low inter-cell interference zone, sub-carriers are allocated for use by some, but not all cells. In some embodiments, in the normal zone, all sub-carriers are allocated to be transmitted with a same transmission power in all cells. In some embodiments, in the low inter-cell interference zone, sub-carriers are allocated to be transmitted with different transmission power than the transmission power used in the normal zone in all cells.

The example patterns 800,810,820,830,840,850 show the combined data and pilot pattern for four antennas. A pattern transmitted by a given antenna includes the data in locations common to all the antennas and pilot symbols for transmission only by the given antenna. A grouping of pilot symbols shown in FIG. 8A would, for example be represented in a given antenna pattern by the pilot symbol for the given antenna and null symbol locations for each other antenna. The data and pilots in each zone may be intended for one or more receivers that are currently within the cell of the transmitter.

In the illustrated example of FIG. 8A, each of the patterns 800,810,820,830,840,850 has control channel information 807 in a first OFDM symbol. The six patterns 800,810,820, 830,840,850 each illustrate a fractional frequency re-use ratio of ½ in the first OFDM symbol containing the control channel information 807 and pilot information. While FIG. 8A illustrates patterns with a fractional frequency re-use ratio of ½ in the OFDM symbol containing control channel information, it is to be understood that an OFDM symbol containing control channel information having other fractional frequency re-use ratios are within the scope of the invention.

Each transmission block contains two groupings of four pilot symbols 808. A first grouping of pilot symbols is located in the first two OFDM symbols and a second grouping of pilot symbols is located in the fourth and fifth OFDM symbols.

The six patterns 800,810,820,830,840,850 each utilize a fractional frequency re-use ratio of 2/3 in the low inter-cell interference zone. For a fractional frequency re-use ratio of 2/3, a BS in a cell using the pattern transmits on 2/3 of sub-carriers in a bandwidth available to the cell and does not transmit on the remaining 1/3 of the sub-carriers. While FIG. 8A illustrates patterns with a fractional frequency re-use ratio of 2/3, it is to be understood that patterns having other fractional frequency re-use ratios are within the scope of the invention. For example, for a fractional frequency re-use ratio of 1/2, a BS in a cell using the pattern transmits on 1/2 of sub-carriers in a bandwidth available to the cell and does not transmit on the remaining 1/2 of the sub-carriers.

In some embodiments the fractional frequency re-use ratio of the OFDM symbol containing control channel information and the fractional frequency re-use ratio of the low inter-cell interference zone are different, as in the patterns of FIG. 8A. In some embodiments the fractional frequency re-use ratio of the OFDM symbol containing control channel information and the fractional frequency re-use ratio of the low inter-cell interference zone are the same.

Pattern 800 of FIG. 8A will now be described in further detail. In the first OFDM symbol the control channel information 807 and pilot information of one of the groupings of pilot symbols 808 combine to occupy twelve of twenty-four sub-carriers included in the two transmission blocks, the remaining twelve sub-carriers are null symbol locations. The null symbol locations can be used by other cells for respective control channel information and/or pilot information in those cells.

In the low inter-cell interference zone, transmission data occupies sixteen of the twenty-four sub-carriers and the remaining eight sub-carriers are null symbol locations. The null symbol locations can be used by other cells for low inter-cell interference transmission data. In the low inter-cell interference zone the groupings of pilot symbols are separated from the low inter-cell interference transmission data by two sub-carriers.

Patterns 810,820,830,840,850 have a similar TTI structure as pattern 800 except that the grouping of pilot symbols 808, control channel information, and low inter-cell interference transmission data are shifted in each pattern with respect to the other patterns. For example, with regard to the grouping of pilot symbols in the first two OFDM symbols, in pattern 810 the grouping of pilot symbols is located in the fifth and sixth sub-carriers, in pattern 820 the grouping of pilot symbols is located in the third and fourth sub-carriers, in pattern 830 the grouping of pilot symbols is located in the first and second sub-carriers, in pattern 840 the grouping of pilot symbols is located in the eleventh and twelfth sub-carriers, and in pattern 850 the grouping of pilot symbols is located in the ninth and tenth sub-carriers.

Figure 8B:
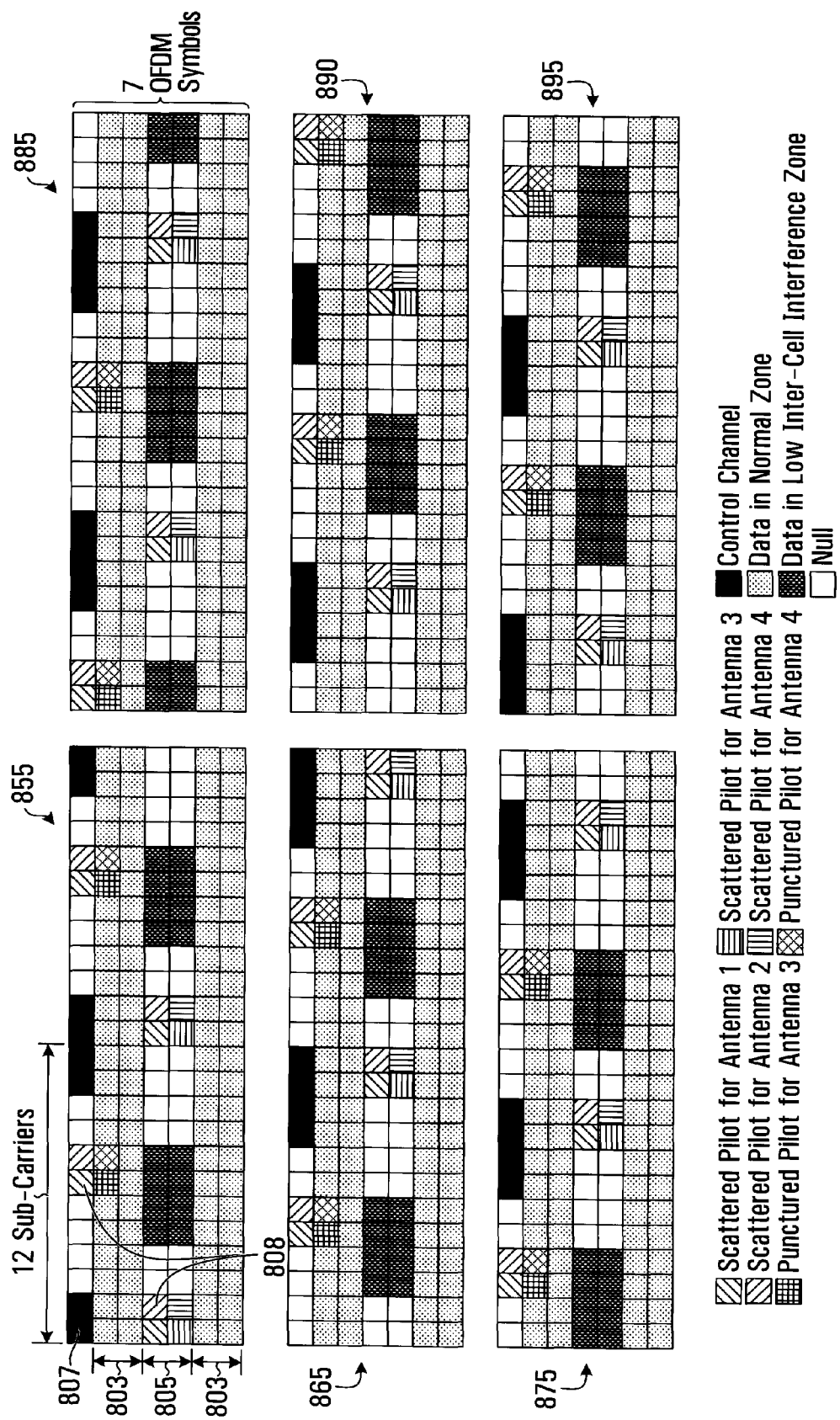
FIG. 8B contains schematic diagrams of pilot patterns for a TDM Based Zone Partition arrangement that incorporate pilot pattern shifting according to another embodiment of the invention.
Figure 9:
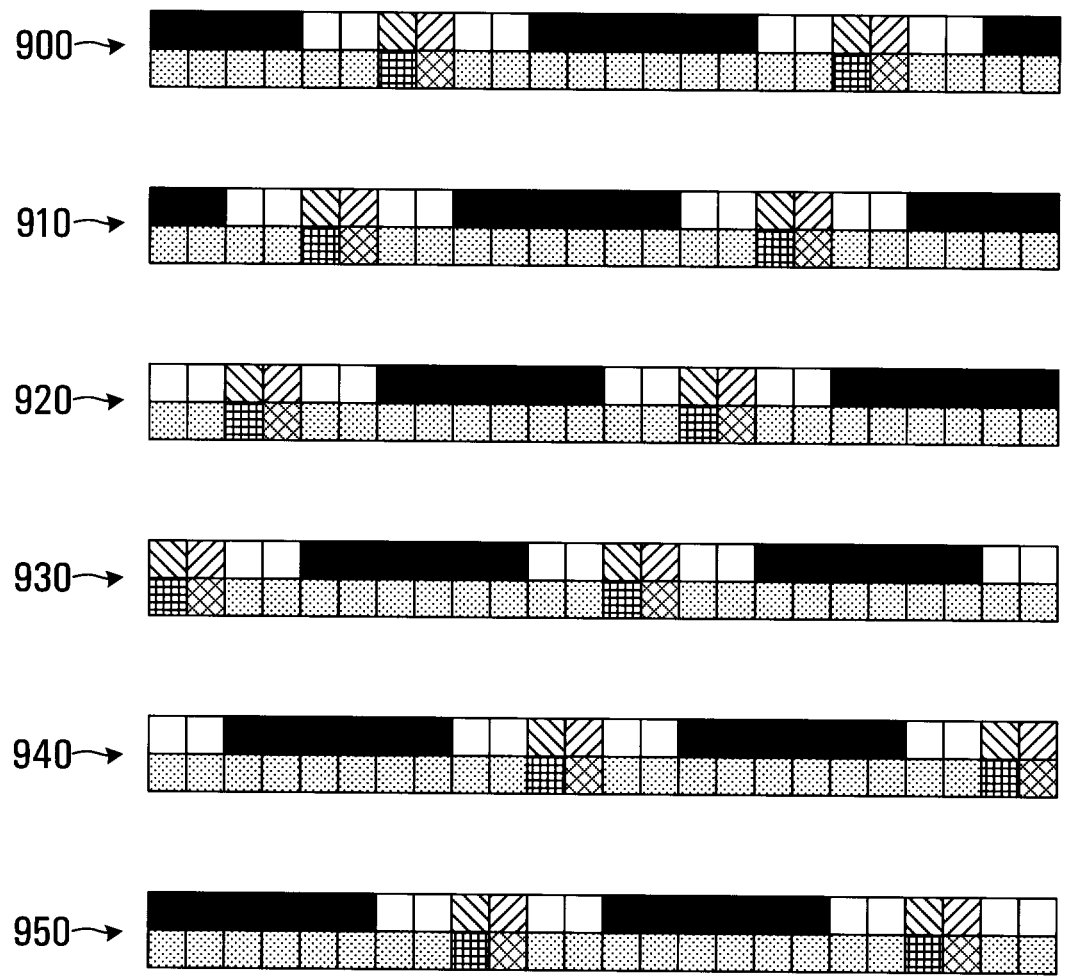
FIG. 9 contains schematic diagrams of pilot patterns for a TDM Based Zone Partition arrangement that incorporates pilot pattern shifting according to another embodiment of the invention.

FIG. 8B illustrates six patterns 855,865,875,885,890,895 that have a similar structure to the six patterns 800,810,820, 830,840,850 of FIG. 8A, except that the low inter-cell interference zone 805 has a fractional frequency re-use ratio of 1/2. The first OFDM symbol of the six patterns 855,865,875, 885,890,895 has the same fractional frequency re-use ratio of 1/2 as the first OFDM symbol of the six patterns 800,810,820, 830,840,850 of FIG. 8A.

FIG. 9A illustrates six patterns 900,910,920,930,940,950 for two OFDM symbols, a first OFDM symbol which includes control channel information and pilot information and a second OFDM symbol with normal zone transmission data and pilot information.

In pilot pattern 900, in the first OFDM symbol the control channel information and pilot information occupy sixteen of the twenty-four sub-carriers, the remaining eight sub-carriers are null symbol locations resulting in a fractional frequency re-use ratio of 2/3. The null symbol locations can be used by other cells for respective control channel information and/or pilot information in those cells.

Patterns 910,920,930,940,950 have a similar structure as pattern 900 except that the grouping of pilot symbols and control channel information are shifted in each pattern with respect to the other patterns.

It is to be understood that the value of the fractional frequency re-use in the low inter-cell interference zone is implementation specific and can vary depending on the desired transmission characteristics of a given cell. In addition, the pattern of the pilots and the spacing between pilot symbols and control channel information and/or low inter-cell interference data is implementation specific and can vary depending on the desired transmission characteristics of a given cell.

In some embodiments a transmission resource is used to transmit more than one sub-channel. For a BS transmitting K sub-bands, each sub-band consisting of L consecutive sub-carriers, an example sub-channel definition for a low inter-cell interference zone using a fractional frequency scheme is generally defined as L sub-carrier pairs with a given separation across J consecutive symbols. In some embodiments the given separation may be an equal separation. In some embodiments a number of sub-carrier pairs in each one of the K sub-bands is L/2. In some embodiments each sub-carrier pair is formed by two adjacent sub-carriers.

It is to be understood that the example sub-channel definition and various embodiments represent a simple sub-channel. Those skilled in the art will realize that there are numerous sub-channel definitions that could be applied for transmitting sub-channels.

FIG. 10A shows an example of the sub-channel definition described above for J=1. An example of J=1 may represent a control channel in a single OFDM symbol. FIG. 10A shows a single OFDM symbol where a number of L consecutive sub-carriers 1010 equals twenty-four and there are four sub-carrier pairs CH1 1015, CH2 1020, CH3 1025, CH4 1030, representing four sub-channels. Pilot symbol information 1040 and null symbol locations 1045 occupy a remainder of the twenty-four sub-carriers of each of the K sub-bands. In this example the fractional frequency re-use ratio equals 1/2 because half of the sub-carriers are used for control channel information and pilot symbol information and the other half are null symbol locations to be used for control channel information and pilot symbol information by other cells.

FIG. 10B shows an example of the general sub-channel definition for J=2. An example of J=2 may represent a traffic channel in the low inter-cell interference zone. FIG. 10B shows two OFDM symbols where a number of L consecutive sub-carriers 1010 equals twenty-four and there are four sub-carrier pairs CH1 1050, CH2 1055, CH3 1060, CH4 1065, representing four sub-channels. Pilot symbol information 1070 and null symbol locations 1075 occupy a remainder of the twenty-four sub-carriers of each of the K sub-bands. In this example the fractional frequency re-use ratio equals 1/2 because half of the sub-carriers are used for control channel information and pilot symbol information and the other half are null symbol locations to be used for control channel information and pilot symbol information by other cells.

It is to be understood that the above examples of J=1 and J=2 are not meant to limit the scope of the invention, as J could be any number≥1.

In some embodiments a same sub-channel definition in the low inter-cell interference zone may be used between neighbouring transmitters.

It is to be understood that fractional frequency re-use ratio in the low inter-cell interference zone is implementation specific and can vary depending on the desired transmission characteristics of a given cell. In addition, the pattern of the pilots and the spacing between pilot symbols and control channel information and/or low inter-cell interference data is implementation specific and can vary depending on the desired transmission characteristics of a given cell.

In some embodiments of the invention at least one fractional frequency re-use zone includes a plurality sub-channels therein.

In some embodiments of the invention each cell has at least one dedicated sub-channel allocated thereto.

In some embodiments, using the fractional frequency scheme enables improving channel estimation performance obtained from pilot data in the first OFDM symbol of the zone. In some embodiments using the fractional frequency scheme in the first OFDM symbol enables channel estimation for both the normal zone and low inter-cell interference zone.

Figure 11:
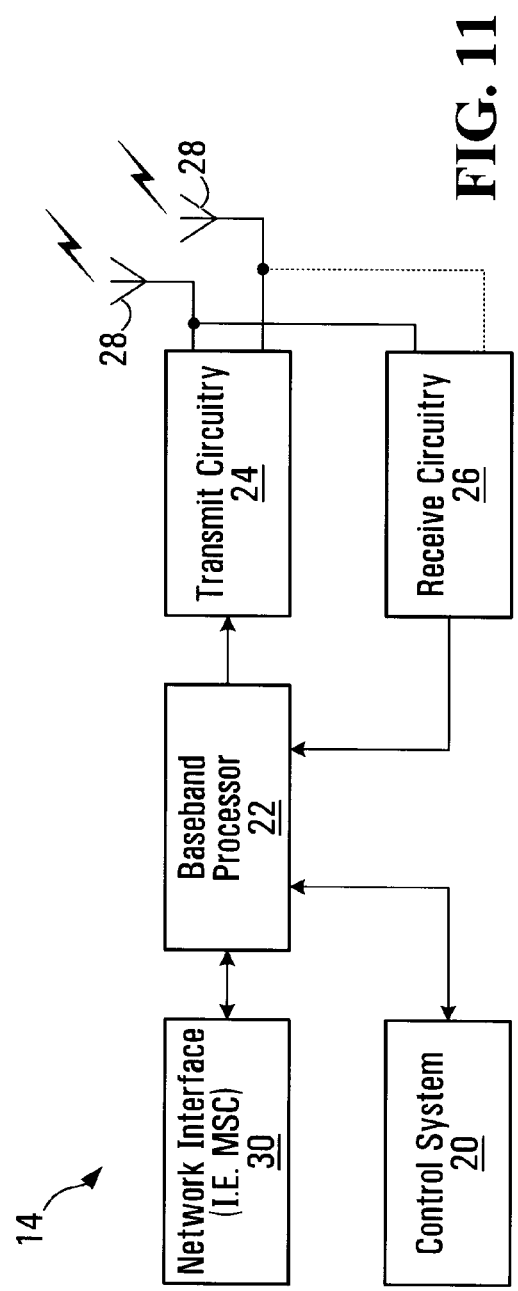
FIG. 11 is a block diagram of an example base station that might be used to implement some embodiments of the present invention.

A high level overview of the mobile terminals 16 and base stations 14 upon which aspects of the present invention may be implemented is provided. With reference to FIG. 11, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 10). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 12:
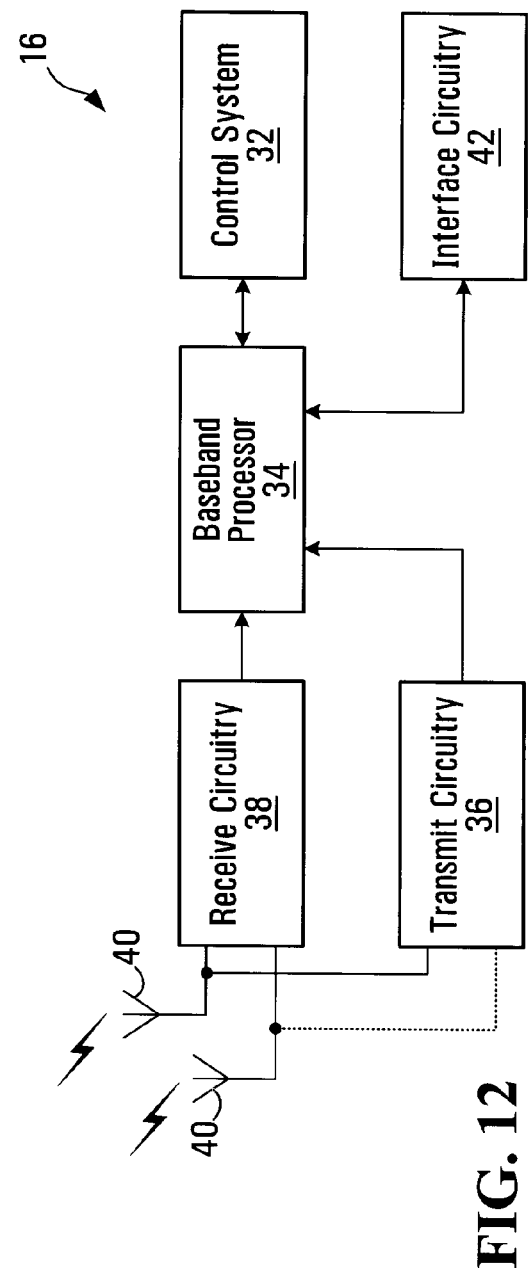
FIG. 12 is a block diagram of an example wireless terminal that might be used to implement some embodiments of the present invention.

With reference to FIG. 12, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 13:
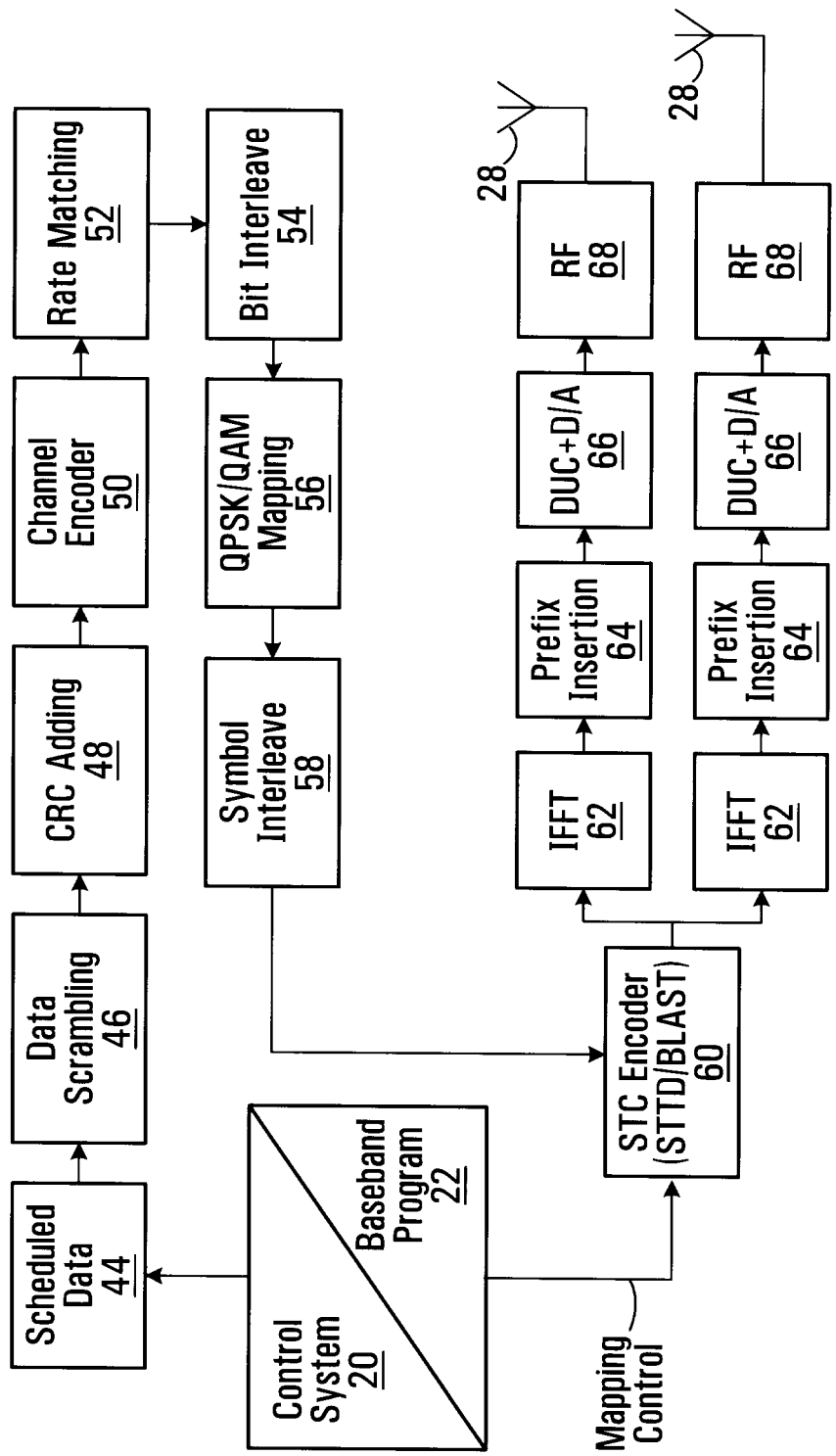
FIG. 13 is a block diagram of a logical breakdown of an example OFDM transmitter architecture that might be used to implement some embodiments of the present invention.

With reference to FIG. 13, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 11 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the two symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 14:
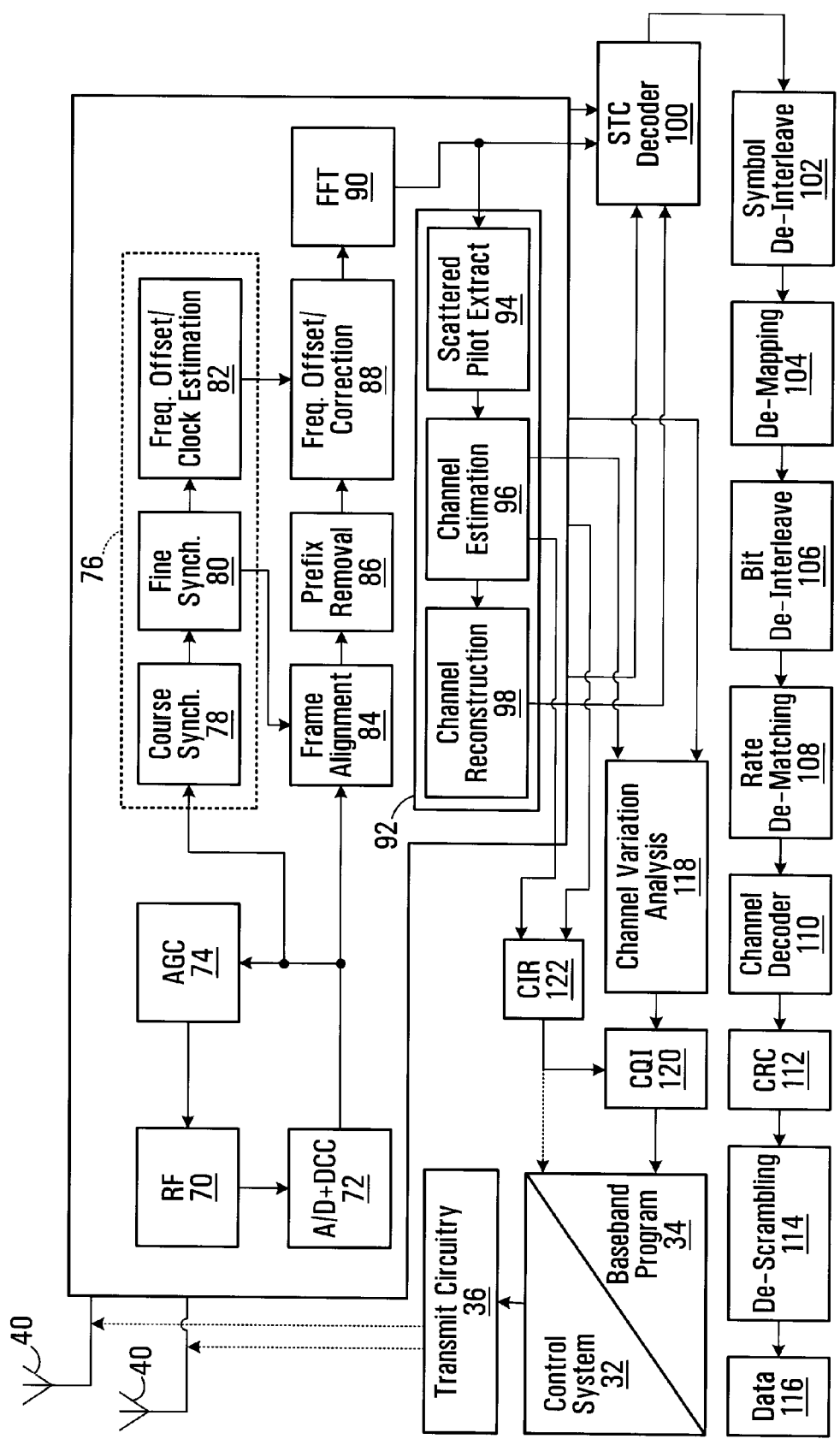
FIG. 14 is a block diagram of a logical breakdown of an example OFDM receiver architecture that might be used to implement some embodiments of the present invention.

Reference is now made to FIG. 14 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 14, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 and 11 to 14 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein. For example, transmitters capable of transformed OFDM are described in applicant's co-pending international patent application PCT/CA2006/000464 filed on Mar. 30, 2006, incorporated in its entirety above.

Numerous modifications and variations of the present invention are possible in light of the above teachings. It is therefore to be understood that within the scope of the appended claims, the invention may be practised otherwise than as specifically described herein.

The invention claimed is:

1. A method for execution in an OFDM communications environment having a plurality of cells, comprising:
for a transmitter corresponding to a first cell;
partitioning a time-frequency transmission resource comprising a plurality of subcarriers over a plurality of OFDM symbol intervals into a first zone and a second zone;
in the first zone, transmitting pilot symbols and data symbols on at least one set of subcarriers which is used by all of the plurality of cells, said transmitting on all of the plurality of cells comprising transmitting with a frequency re-use-1 scheme; and
in the second zone, transmitting pilot symbols and data symbols on at least one set of subcarriers which is used by less than all of the plurality of cells so as to mitigate inter-cell interference.

2. The method of claim 1, wherein when at least one other cell of the plurality of cells uses a same first and second zone partitioning of a respective time-frequency transmission resource, the method further comprising:
the at least one other cell, in the second zone, transmitting on at least one set of subcarriers which is different than the set of subcarriers used by the transmitter of the first cell.

3. The method of claim 1 wherein transmitting in the second zone on at least one set of subcarriers further comprises:
transmitting on at least one set of subcarriers which is different than sets of subcarriers used by transmitters corresponding to respective cells adjacent to the first cell.

4. The method of claim 1, further comprising:
for a transmitter corresponding to a second cell;
partitioning an OFDM transmission resource into a first zone and a second zone in coordination with the partitioning of the time-frequency transmission resource of the first cell such that zone partitioning of the first and second cells is the same;
in the second zone, transmitting on at least one set of subcarriers which is different than the at least one set of subcarriers used by the transmitter of the first cell.

5. The method of claim 1, further comprising:
for a transmitter corresponding to a second cell, partitioning an time-frequency transmission resource into a first zone and a second zone independently of the partitioning of the OFDM transmission resource of the first cell.

6. The method of claim 1 wherein partitioning the time-frequency transmission resource into a first zone and a second zone is based on time division multiplexing (TDM).

7. The method of claim 1 wherein partitioning the time-frequency transmission resource into a first zone and a second zone is based on frequency division multiplexing (FDM).

8. The method of claim 1 wherein partitioning the time-frequency transmission resource into a first zone and a second zone is based on combined TDM/FDM.

9. The method of claim 1, further comprising inserting control information in a control channel formed in at least one OFDM symbol in the time-frequency transmission resource.

10. The method of claim 1, further comprising inserting scattered pilot symbol information in the time-frequency transmission resource.

11. The method of claim 10, further comprising inserting the pilot symbol information of the transmitter of the first cell in the time-frequency transmission resource with a pattern that is the same as the other cells of the plurality of cells, but is shifted in time and/or frequency with respect to the other cells.

12. The method of claim 1, wherein in the second zone, transmitting on at least one set of subcarriers comprises transmitting with a fractional frequency re-use scheme.

13. The method of claim 12 wherein transmitting with a fractional frequency re-use scheme for the transmitter comprises transmitting at least one of channel control information, data, and pilot symbol information in M locations of an OFDM symbol and nulls in N locations of the OFDM symbol, in which the OFDM symbol has M+N locations, where the nulls are used for at least one of channel control information, data, and pilot symbol information in other cells of the plurality of cells.

14. The method of claim 12 wherein transmitting with a fractional frequency re-use scheme further comprises transmitting pilot symbol information having a pattern in the time-frequency transmission resource of the transmitter of the first cell that is the same as the other cells, but is shifted in time and/or frequency with respect to the other cells.

15. The method of claim 12 wherein a sub-channel definition using the fractional frequency re-use scheme is defined as L subcarrier pairs with a given separation across J consecutive OFDM symbols when the transmission resource has K sub-bands, each of the K sub-bands consisting of L consecutive subcarriers.

16. The method of claim 1, wherein the at least one set of subcarriers in the second zone comprises a plurality of contiguous subcarriers.

17. The method of claim 1, wherein the at least one set of subcarriers in the first zone comprises a plurality of contiguous subcarriers.

18. The method of claim 1, wherein the plurality of OFDM symbols comprises an odd number of OFDM symbols.

19. The method of claim 1, wherein the partitioning of the at least one time-frequency transmission resource into the first zone and the second zone is dynamically configurable.

20. The method of claim 1, wherein the time-frequency transmission resource is one of an OFDM transmission resource and a transformed OFDM transmission resource.

21. An apparatus for use in a cell in an OFDM communications environment having a plurality of cells, the apparatus comprising:
a transmitter that transmits using a time-frequency transmission resource, the time-frequency transmission resource comprising a plurality of subcarriers over a plurality of OFDM symbol intervals partitioned into a first zone and a second zone, the transmitter transmitting pilot symbols and data symbols in the first zone on at least one set of subcarriers, which is used by all of the plurality of cells, said transmitting on all of the plurality of cells comprising transmitting with a frequency re-use-1 scheme, and transmitting pilot symbols and data symbols in the second zone on at least one set of subcarriers which is used by less than all of the plurality of cells so as to mitigate inter-cell interference.

22. The apparatus of claim 21, wherein the time-frequency transmission resource is one of an OFDM transmission resource and a transformed OFDM transmission resource.

23. A communication network comprising:
 a plurality of telecommunication cells, each cell comprising an OFDM transmitter, the OFDM transmitter in each respective cell adapted to:
  partition a time-frequency transmission resource comprising a plurality of subcarriers over a plurality of OFDM symbol intervals into a first zone and a second zone;
  in the first zone, transmit pilot symbols and data symbols on at least one set of subcarriers which is used by all of the plurality of cells, the transmission in the first zone, on all of the plurality of cells, comprises transmitting with a frequency re-use-1 scheme in the communication network; and
  in the second zone, transmit pilot symbols and data symbols on at least one set of subcarriers which is used by less than all of the plurality of cells so as to mitigate inter-cell interference.

24. The communication network of claim 23 wherein at least two OFDM transmitters coordinate the partition of the time-frequency transmission resource used by each respective OFDM transmitter and selection of the set of subcarriers used to transmit in the second zone by each respective OFDM transmitter.

25. A method for execution in an OFDM communications environment having a plurality of cells, comprising:
 for a transmitter corresponding to a first cell;
 partitioning a time-frequency transmission resource comprising a plurality of subcarriers over a plurality of OFDM symbol intervals into a first zone and a second zone;
 inserting scattered pilot symbol information in the time-frequency transmission resource, said inserting scattered pilot symbol information comprising inserting pilot symbols into the at least one time-frequency channel resource for transmission on N transmitting antenna where $N>=1$;
 in the first zone, transmitting pilot symbols and data symbols on at least one set of subcarriers which is used by all of the plurality of cells; and
 in the second zone, transmitting pilot symbols and data symbols on at least one set of subcarriers which is used by less than all of the plurality of cells so as to mitigate inter-cell interference;
 for each antenna partitioning N time-frequency channel resources to be simultaneously transmitted on N antennas into a set of corresponding first zones and a set of corresponding second zones, each set of corresponding first zones consisting of a first zone for each of the N time-frequency channel resources and each set of corresponding second zones consisting of a second zone for each of the N time-frequency channel resources, all the first and second zones in a given set of corresponding zones having a common size and location;
 in the set of corresponding first zones, transmitting on the at least one set of subcarriers which is used by all of the plurality of cells; and
 in the set of corresponding second zones, transmitting on the at least one set of subcarriers which is used by less than all of the plurality of cells to mitigate inter-cell interference between the at least two cells.

* * * * *